(12) United States Patent
Higginson et al.

(10) Patent No.: US 10,691,654 B2
(45) Date of Patent: *Jun. 23, 2020

(54) AUTOMATED DATABASE MIGRATION ARCHITECTURE

(71) Applicant: ORACLE INTERNATIONAL CORPORATION, Redwood Shores, CA (US)

(72) Inventors: Antony Higginson, Widnes (GB); John Masterson, Navan (IE); Sean Fitzpatrick, Brittas Bay (IE); Peter Robertshaw, London (GB); Elmar Spiegelberg, Bedburg (DE); Stephan Buhne, Essen (DE); Michael Weick, Heddesheim (DE); Nick Balch, High Wycombe (GB); Florin Popescu, Bucharest (RO)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 28 days.

This patent is subject to a terminal disclaimer.

(21) Appl. No.: 16/003,557

(22) Filed: Jun. 8, 2018

(65) Prior Publication Data

US 2018/0293233 A1 Oct. 11, 2018

Related U.S. Application Data

(63) Continuation of application No. 13/937,868, filed on Jul. 9, 2013, now Pat. No. 9,996,562.

(51) Int. Cl.
G06F 16/21 (2019.01)
(52) U.S. Cl.
CPC ................. *G06F 16/214* (2019.01)

(58) Field of Classification Search
CPC ..................................................... G06F 16/214
See application file for complete search history.

(56) References Cited

U.S. PATENT DOCUMENTS

| 6,016,394 A | 1/2000 | Walker |
| 6,185,625 B1 | 2/2001 | Tso et al. |

(Continued)

FOREIGN PATENT DOCUMENTS

| CN | 1545674 | 11/2004 |
| CN | 1652087 | 8/2005 |

(Continued)

OTHER PUBLICATIONS

U.S. Appl. No. 13/937,344, Corrected Notice of Allowability dated Sep. 15, 2016, 2 pages.

(Continued)

*Primary Examiner* — Van H Oberly
(74) *Attorney, Agent, or Firm* — Kilpatrick Townsend Stockton LLP

(57) ABSTRACT

A method of migrating data from one or more source databases to one or more target databases may include generating a pre-migration analysis for a plurality of objects stored in the one or more source databases, and generating a plurality of migration scripts that transfer the plurality of objects from the one or more source databases to the one or more target databases. The method may also include generating a migration plan that defines an execution order for the plurality of migration scripts, and migrating the plurality of objects from the one or more source databases to one or more target databases according to the migration plan. The method may further include validating the plurality of objects on the one or more target databases.

20 Claims, 17 Drawing Sheets

(56) References Cited

U.S. PATENT DOCUMENTS

| | | |
|---|---|---|
| 6,477,483 B1 | 11/2002 | Scarlat et al. |
| 6,604,110 B1 | 8/2003 | Savage et al. |
| 6,615,220 B1 | 9/2003 | Austin et al. |
| 6,738,811 B1 | 5/2004 | Liang |
| 6,973,489 B1 | 12/2005 | Levy |
| 7,065,541 B2 | 6/2006 | Gupta et al. |
| 7,177,866 B2 * | 2/2007 | Holenstein et al. |
| 7,290,003 B1 * | 10/2007 | Tong ............... G06F 40/154 |
| 7,343,467 B2 | 3/2008 | Brown et al. |
| 7,548,898 B1 * | 6/2009 | Tarenskeen ........... G06F 16/214 |
| 7,580,862 B1 | 8/2009 | Montelo et al. |
| 7,620,665 B1 | 11/2009 | George et al. |
| 7,693,983 B1 | 4/2010 | Gupta et al. |
| 7,865,584 B2 | 1/2011 | Grossner et al. |
| 7,886,028 B2 | 2/2011 | Kogoh |
| 7,913,056 B2 | 3/2011 | Brown et al. |
| 8,059,565 B2 | 11/2011 | Dholakia et al. |
| 8,074,107 B2 | 12/2011 | Sivasubramanian et al. |
| 8,150,811 B1 | 4/2012 | Tarenskeen et al. |
| 8,175,863 B1 | 5/2012 | Ostermeyer et al. |
| 8,271,757 B1 | 9/2012 | Chatterjee et al. |
| 8,356,010 B2 | 1/2013 | Driesen |
| 8,584,230 B2 | 11/2013 | Dillaway et al. |
| 8,606,894 B1 | 12/2013 | Fremont et al. |
| 8,639,989 B1 | 1/2014 | Sorenson, III et al. |
| 8,924,353 B1 | 12/2014 | Patwardhan et al. |
| 8,943,032 B1 | 1/2015 | Xu et al. |
| 9,098,364 B2 | 8/2015 | Davis |
| 9,176,773 B2 | 11/2015 | Fries et al. |
| 9,401,904 B1 | 7/2016 | Hankins et al. |
| 9,442,983 B2 | 9/2016 | Higginson et al. |
| 9,491,072 B2 | 11/2016 | Raghunathan et al. |
| 9,602,599 B2 | 3/2017 | Bhattacharya et al. |
| 9,626,710 B1 | 4/2017 | Chheda et al. |
| 9,736,013 B2 | 8/2017 | Markley et al. |
| 9,747,311 B2 | 8/2017 | Buehne et al. |
| 9,762,461 B2 | 9/2017 | Raghunathan et al. |
| 9,792,321 B2 | 10/2017 | Buehne et al. |
| 9,805,070 B2 | 10/2017 | Buehne et al. |
| 9,811,527 B1 | 11/2017 | Esposito et al. |
| 9,967,154 B2 | 5/2018 | Masterson et al. |
| 9,996,562 B2 | 6/2018 | Higginson et al. |
| 10,007,701 B2 | 6/2018 | Subramanian et al. |
| 10,198,255 B2 | 2/2019 | Higginson et al. |
| 10,248,671 B2 | 4/2019 | Buehne et al. |
| 2001/0029502 A1 | 10/2001 | Oeda |
| 2001/0044795 A1 | 11/2001 | Cohen et al. |
| 2002/0002578 A1 | 1/2002 | Yamashita |
| 2002/0019826 A1 | 2/2002 | Tan |
| 2002/0147645 A1 | 10/2002 | Alao et al. |
| 2002/0177977 A1 | 11/2002 | Scarlat et al. |
| 2002/0194329 A1 | 12/2002 | Alling |
| 2002/0198984 A1 | 12/2002 | Goldstein et al. |
| 2003/0037034 A1 | 2/2003 | Daniels et al. |
| 2003/0066049 A1 | 4/2003 | Atwood et al. |
| 2003/0069903 A1 | 4/2003 | Gupta et al. |
| 2003/0192028 A1 | 10/2003 | Gusler et al. |
| 2004/0098425 A1 | 5/2004 | Wiss et al. |
| 2004/0153358 A1 | 8/2004 | Lienhart |
| 2004/0167840 A1 | 8/2004 | Tully et al. |
| 2004/0178261 A1 | 9/2004 | Potonniee et al. |
| 2004/0181790 A1 | 9/2004 | Herrick |
| 2004/0260875 A1 | 12/2004 | Murotani et al. |
| 2005/0021567 A1 | 1/2005 | Holenstein et al. |
| 2005/0055357 A1 | 3/2005 | Campbell |
| 2005/0055446 A1 | 3/2005 | Chidambaran et al. |
| 2005/0102318 A1 | 5/2005 | Odhner et al. |
| 2005/0204241 A1 | 9/2005 | Tamakoshi |
| 2006/0059253 A1 | 3/2006 | Goodman et al. |
| 2006/0112247 A1 | 5/2006 | Ramany et al. |
| 2006/0156086 A1 | 7/2006 | Flynn et al. |
| 2006/0173875 A1 | 8/2006 | Stefaniak |
| 2006/0179171 A1 | 8/2006 | Stefaniak et al. |
| 2006/0179431 A1 | 8/2006 | Devanathan et al. |
| 2006/0235899 A1 | 10/2006 | Tucker |
| 2006/0282825 A1 | 12/2006 | Taylor |
| 2007/0028234 A1 | 2/2007 | Sero et al. |
| 2007/0067847 A1 | 3/2007 | Wiemer et al. |
| 2007/0089092 A1 | 4/2007 | Schmidt et al. |
| 2007/0106710 A1 | 5/2007 | Haustein et al. |
| 2007/0150488 A1 | 6/2007 | Barsness et al. |
| 2007/0234346 A1 | 10/2007 | Kramer et al. |
| 2007/0239774 A1 | 10/2007 | Bodily et al. |
| 2007/0250829 A1 | 10/2007 | Hillier et al. |
| 2007/0299892 A1 | 12/2007 | Nakahara |
| 2008/0247320 A1 | 10/2008 | Grah et al. |
| 2008/0313595 A1 | 12/2008 | Boulineau et al. |
| 2009/0012981 A1 | 1/2009 | Kogoh |
| 2009/0070733 A1 | 3/2009 | Huang et al. |
| 2009/0070771 A1 | 3/2009 | Yuyitung et al. |
| 2009/0113399 A1 | 4/2009 | Tzoref et al. |
| 2009/0126022 A1 | 5/2009 | Sakaki |
| 2009/0157864 A1 | 6/2009 | Kim |
| 2009/0187413 A1 | 7/2009 | Abels et al. |
| 2009/0210857 A1 | 8/2009 | Martineau |
| 2009/0238078 A1 | 9/2009 | Robinson et al. |
| 2009/0276771 A1 | 11/2009 | Nickolov et al. |
| 2009/0313311 A1 | 12/2009 | Hoffmann et al. |
| 2010/0005097 A1 | 1/2010 | Liang et al. |
| 2010/0049851 A1 | 2/2010 | Garrison et al. |
| 2010/0049934 A1 | 2/2010 | Tomita et al. |
| 2010/0082543 A1 | 4/2010 | Nagarajan |
| 2010/0191884 A1 | 7/2010 | Holenstein et al. |
| 2010/0192156 A1 | 7/2010 | Hollingsworth |
| 2010/0198799 A1 | 8/2010 | Krishnan et al. |
| 2010/0262974 A1 | 10/2010 | Uyeda |
| 2011/0022711 A1 | 1/2011 | Cohn |
| 2011/0093436 A1 | 4/2011 | Zha et al. |
| 2011/0107327 A1 | 5/2011 | Barkie et al. |
| 2011/0161933 A1 | 6/2011 | Hudson |
| 2011/0173327 A1 | 7/2011 | Chen et al. |
| 2011/0251992 A1 | 10/2011 | Bethlehem et al. |
| 2012/0017112 A1 | 1/2012 | Broda et al. |
| 2012/0041933 A1 | 2/2012 | Driesen |
| 2012/0096134 A1 | 4/2012 | Suit |
| 2012/0102498 A1 | 4/2012 | Subramanya et al. |
| 2012/0150642 A1 | 6/2012 | Kandanala et al. |
| 2012/0158821 A1 | 6/2012 | Barros |
| 2012/0221845 A1 | 8/2012 | Ferris |
| 2012/0254435 A1 | 10/2012 | Zhaofu et al. |
| 2012/0265726 A1 * | 10/2012 | Padmanabhan ....... G06F 16/214 707/602 |
| 2012/0284360 A1 | 11/2012 | Bense et al. |
| 2012/0297016 A1 | 11/2012 | Iyer et al. |
| 2012/0297059 A1 | 11/2012 | Bross |
| 2012/0303739 A1 | 11/2012 | Ferris |
| 2012/0311128 A1 | 12/2012 | Pechanec et al. |
| 2013/0067298 A1 | 3/2013 | Li et al. |
| 2013/0085742 A1 | 4/2013 | Barker et al. |
| 2013/0085989 A1 * | 4/2013 | Nayyar ................ G06F 16/119 707/610 |
| 2013/0086130 A1 | 4/2013 | Wang et al. |
| 2013/0152050 A1 | 6/2013 | Chang et al. |
| 2013/0173546 A1 | 7/2013 | Cline et al. |
| 2013/0173547 A1 | 7/2013 | Cline et al. |
| 2013/0211559 A1 | 8/2013 | Lawson et al. |
| 2013/0268643 A1 | 10/2013 | Chang et al. |
| 2013/0268799 A1 | 10/2013 | Mestery et al. |
| 2013/0268800 A1 * | 10/2013 | Rangaiah ............ G06F 11/2033 714/4.11 |
| 2013/0283364 A1 | 10/2013 | Chang et al. |
| 2013/0297802 A1 | 11/2013 | Laribi et al. |
| 2013/0311968 A1 | 11/2013 | Sharma |
| 2013/0326028 A1 | 12/2013 | Cox et al. |
| 2013/0339419 A1 | 12/2013 | Emaru |
| 2014/0007216 A1 | 1/2014 | Ahn |
| 2014/0012960 A1 | 1/2014 | Chien |
| 2014/0019212 A1 | 1/2014 | Lieblich et al. |
| 2014/0019961 A1 | 1/2014 | Neuse et al. |
| 2014/0059559 A1 | 2/2014 | Alatorre et al. |
| 2014/0068071 A1 | 3/2014 | Fremont et al. |
| 2014/0075031 A1 | 3/2014 | Doering et al. |
| 2014/0075033 A1 | 3/2014 | Doering et al. |
| 2014/0089495 A1 | 3/2014 | Akolkar et al. |

(56) References Cited

U.S. PATENT DOCUMENTS

| | | |
|---|---|---|
| 2014/0089809 A1 | 3/2014 | Levy et al. |
| 2014/0109053 A1 | 4/2014 | Vasudevan et al. |
| 2014/0129690 A1 | 5/2014 | Jaisinghani et al. |
| 2014/0172782 A1 | 6/2014 | Schuenzel et al. |
| 2014/0195636 A1* | 7/2014 | Karve ............... G06F 3/0619 709/215 |
| 2014/0215045 A1 | 7/2014 | Wang et al. |
| 2014/0279890 A1 | 9/2014 | Srinivasan et al. |
| 2014/0337429 A1* | 11/2014 | Asenjo ............... H04L 65/403 709/204 |
| 2014/0344439 A1 | 11/2014 | Kempf et al. |
| 2014/0373011 A1 | 12/2014 | Anderson et al. |
| 2015/0019195 A1 | 1/2015 | Davis |
| 2015/0019197 A1 | 1/2015 | Higginson et al. |
| 2015/0019478 A1 | 1/2015 | Buehne et al. |
| 2015/0019479 A1 | 1/2015 | Buehne et al. |
| 2015/0019487 A1 | 1/2015 | Buehne et al. |
| 2015/0019488 A1 | 1/2015 | Higginson et al. |
| 2015/0019564 A1 | 1/2015 | Higginson et al. |
| 2015/0019700 A1 | 1/2015 | Masterson et al. |
| 2015/0019706 A1 | 1/2015 | Raghunathan et al. |
| 2015/0019707 A1 | 1/2015 | Raghunathan et al. |
| 2015/0020059 A1 | 1/2015 | Davis |
| 2015/0058467 A1 | 2/2015 | Douglas et al. |
| 2015/0096011 A1 | 4/2015 | Watt |
| 2015/0264128 A1 | 9/2015 | Huang et al. |
| 2015/0355947 A1 | 12/2015 | Polkovnikov |
| 2015/0358392 A1 | 12/2015 | Ramalingam et al. |
| 2015/0363396 A1 | 12/2015 | Sengupta et al. |
| 2016/0269371 A1 | 9/2016 | Coimbatore |
| 2016/0364229 A1 | 12/2016 | Higginson et al. |
| 2017/0075709 A1 | 3/2017 | Feng et al. |
| 2017/0118244 A1 | 4/2017 | Bai et al. |
| 2017/0278012 A1 | 9/2017 | Prasad et al. |
| 2017/0337193 A1 | 11/2017 | Buehne et al. |
| 2017/0351716 A1 | 12/2017 | Higginson et al. |
| 2018/0060313 A1 | 3/2018 | Buehne et al. |
| 2018/0157653 A1 | 6/2018 | Wadhwa et al. |
| 2018/0285353 A1 | 10/2018 | Ramohalli Gopala Rao et al. |

FOREIGN PATENT DOCUMENTS

| | | |
|---|---|---|
| CN | 1734421 | 2/2006 |
| CN | 1955965 | 5/2007 |
| CN | 101084481 | 12/2007 |
| CN | 101204042 | 6/2008 |
| CN | 101266606 | 9/2008 |
| CN | 101266606 A | 9/2008 |
| CN | 101322113 | 12/2008 |
| CN | 101473594 | 7/2009 |
| CN | 101919205 | 12/2010 |
| CN | 102656565 | 9/2012 |
| CN | 102662757 | 9/2012 |
| CN | 102982085 | 3/2013 |
| CN | 102982085 A | 3/2013 |
| CN | 103109271 | 5/2013 |
| CN | 103176988 | 6/2013 |
| CN | 103176988 A | 6/2013 |
| CN | 103297492 | 9/2013 |
| CN | 103530290 | 1/2014 |
| CN | 103530290 A | 1/2014 |
| CN | 105308577 | 2/2016 |
| CN | 105324756 | 2/2016 |
| CN | 105324769 | 2/2016 |
| CN | 105359102 | 2/2016 |
| CN | 105359146 | 2/2016 |
| CN | 105359147 | 2/2016 |
| CN | 105393250 | 3/2016 |
| CN | 105556515 | 5/2016 |
| CN | 105580032 | 5/2016 |
| CN | 105580032 | 11/2017 |
| CN | 105308577 | 1/2018 |
| CN | 107729252 | 2/2018 |
| CN | 105324756 | 6/2019 |
| CN | 105324769 | 6/2019 |
| CN | 105359146 | 7/2019 |
| CN | 105393250 | 7/2019 |
| CN | 105359147 | 8/2019 |
| EP | 1611532 | 10/2008 |
| EP | 2418591 | 2/2012 |
| EP | 3019958 | 5/2016 |
| EP | 3019961 | 5/2016 |
| EP | 3019962 | 5/2016 |
| EP | 3019975 | 5/2016 |
| EP | 3019976 | 5/2016 |
| EP | 3019979 | 5/2016 |
| EP | 3019980 | 5/2016 |
| EP | 3019981 | 5/2016 |
| EP | 3020010 | 5/2016 |
| EP | 3019961 | 3/2018 |
| EP | 3019976 | 12/2018 |
| EP | 3418921 | 12/2018 |
| GB | 2468742 | 9/2010 |
| JP | 2006277153 | 10/2006 |
| WO | 9952047 | 10/1999 |
| WO | 0153949 | 7/2001 |
| WO | 2010030489 | 3/2010 |
| WO | 2012047757 | 4/2012 |
| WO | 2013072925 | 5/2013 |
| WO | 2014032262 | 3/2014 |
| WO | 2015005991 | 1/2015 |
| WO | 2015005994 | 1/2015 |
| WO | 2015006124 | 1/2015 |
| WO | 2015006129 | 1/2015 |
| WO | 2015006132 | 1/2015 |
| WO | 2015006137 | 1/2015 |
| WO | 2015006138 | 1/2015 |
| WO | 2015006308 | 1/2015 |
| WO | 2015006358 | 1/2015 |
| WO | 2015191119 | 12/2015 |
| WO | 2017213803 | 12/2017 |

OTHER PUBLICATIONS

U.S. Appl. No. 13/937,344, Final Office Action dated Feb. 11, 2016, 12 pages.

U.S. Appl. No. 13/937,344, Non-Final Office Action dated Sep. 24, 2015, 11 pages.

U.S. Appl. No. 13/937,344, Notice of Allowance dated May 4, 2016, 11 pages.

U.S. Appl. No. 13/937,344, Notice of Allowance dated Oct. 11, 2016, 2 pages.

U.S. Appl. No. 13/937,344, Notice of Allowance dated Jun. 6, 2016, 5 pages.

U.S. Appl. No. 13/937,483, Advisory Action dated May 12, 2016, 3 pages.

U.S. Appl. No. 13/937,483, Final Office Action dated Feb. 26, 2016, 13 pages.

U.S. Appl. No. 13/937,483, Non-Final Office Action dated Aug. 12, 2016, 13 pages.

U.S. Appl. No. 13/937,483, Non-Final Office Action dated Sep. 25, 2015, 13 pages.

U.S. Appl. No. 13/937,483, Notice of Allowance dated May 3, 2017, 5 pages.

U.S. Appl. No. 13/937,483, Notice of Allowance dated Jan. 20, 2017, 8 pages.

U.S. Appl. No. 13/937,486, Final Office Action dated Jul. 28, 2016, 18 pages.

U.S. Appl. No. 13/937,486, Non-Final Office Action dated Jan. 11, 2016, 14 pages.

U.S. Appl. No. 13/937,486, Non-Final Office Action dated Nov. 4, 2016, 20 pages.

U.S. Appl. No. 13/937,486, Notice of Allowance dated Jun. 16, 2017, 5 pages.

U.S. Appl. No. 13/937,545, Final Office Action dated May 13, 2016, 20 pages.

U.S. Appl. No. 13/937,545, Non-Final Office Action dated Feb. 7, 2017, 19 pages.

(56) References Cited

OTHER PUBLICATIONS

U.S. Appl. No. 13/937,545, Non-Final Office Action dated Nov. 10, 2015, 19 pages.
U.S. Appl. No. 13/937,545, Notice of Allowance dated Jun. 15, 2017, 10 pages.
U.S. Appl. No. 13/937,868, Final Office Action date Apr. 22, 2016, 23 pages.
U.S. Appl. No. 13/937,868, Final Office Action dated Oct. 27, 2017, 25 pages.
U.S. Appl. No. 13/937,868, Non-Final Office Action dated Nov. 4, 2015, 18 pages.
U.S. Appl. No. 13/937,868, Non-Final Office Action dated Apr. 5, 2017, 23 pages.
U.S. Appl. No. 13/937,868, Notice of Allowance dated Feb. 8, 2018, 10 pages.
U.S. Appl. No. 13/937,885, Final Office Action dated May 19, 2017, 22 pages.
U.S. Appl. No. 13/937,885, Non-Final Office Action dated Aug. 18, 2016, 32 pages.
U.S. Appl. No. 13/937,970, Advisory Action dated Apr. 13, 2017, 3 pages.
U.S. Appl. No. 13/937,970, Final Office Action dated Dec. 10, 2015, 18 pages.
U.S. Appl. No. 13/937,970, Final Office Action dated Dec. 1, 2016, 22 pages.
U.S. Appl. No. 13/937,970, Non-Final Office Action dated May 5, 2015, 17 pages.
U.S. Appl. No. 13/937,970, Non-Final Office Action dated May 12, 2016, 28 pages.
U.S. Appl. No. 13/937,970, Non-Final Office Action dated Jun. 26, 2017, 31 pages.
U.S. Appl. No. 13/937,970, Notice of Allowance dated Dec. 28, 2017, 9 pages.
U.S. Appl. No. 13/937,970, Supplemental Notice of Allowance dated Jan. 19, 2018, 6 pages.
U.S. Appl. No. 13/937,977, Corrected Notice of Allowability dated Jul. 18, 2016, 2 pages.
U.S. Appl. No. 13/937,977, Final Office Action dated Feb. 26, 2015, 30 pages.
U.S. Appl. No. 13/937,977, Non-Final Office Action dated Aug. 12, 2014, 28 pages.
U.S. Appl. No. 13/937,977, Non-Final Office Action dated Aug. 19, 2015, 34 pages.
U.S. Appl. No. 13/937,977, Notice of Allowance dated Mar. 16, 2016, 18 pages.
U.S. Appl. No. 13/937,988, Non-Final Office Action dated Sep. 1, 2016, 10 pages.
U.S. Appl. No. 13/937,988, Notice of Allowance dated Apr. 27, 2017, 8 pages.
U.S. Appl. No. 13/938,061, Advisory Action dated Jul. 26, 2017, 6 pages.
U.S. Appl. No. 13/938,061, Final Office Action dated Mar. 23, 2017, 29 pages.
U.S. Appl. No. 13/938,061, Non-Final Office Action dated Aug. 18, 2016, 29 pages.
U.S. Appl. No. 13/938,066, Corrected Notice of Allowability dated Jun. 2, 2015, 2 pages.
U.S. Appl. No. 13/938,066, Non-Final Office Action dated Dec. 17, 2014, 19 pages.
U.S. Appl. No. 13/938,066, Notice of Allowance dated Apr. 29, 2015, 15 pages.
U.S. Appl. No. 15/250,522, Non-Final Office Action dated Mar. 1, 2018, 15 pages.
U.S. Appl. No. 15/789,049, Non-Final Office Action dated Feb. 2, 2018, 14 pages.
Baysal et al., A Bug You Like: A Framework for Automated Assignment of Bugs, Program Comprehension, 2009. ICPC '09. IEEE 17th International Conference, May 17-19, 2009, pp. 297-298.
Chanchary et al., Data Migration: Connecting Databases in the Cloud, ICCIT 2012, Saudi Arabia, Available Online at: http://www.chinacloud.cnjupload/2012-03/12033108076850.pdf, Jun. 28, 2012, pp. 450-455.
Charles, Bug Severity vs. Priority, Quality Intelligence Blog, Available Online at: http://quality-intelligence.blogspot.com/2010/08/bug-severity-vs-priority.html, Aug. 22, 2010, 6 pages.
Chinese Application No. CN201480035255.X, Notice of Decision to Grant dated Aug. 29, 2017.
Chinese Application No. CN201480035255.X, Office Action dated Feb. 27, 2017, 11 pages. (5 pages for the original document and 6 pages for the English translation).
Chinese Application No. CN201480035257.9, Notice of Decision to Grant dated Oct. 11, 2017.
Chinese Application No. CN201480035257.9, Office Action dated Apr. 6, 2017, 10 pages (5 pages for the original document and 5 pages for the English translation).
Chinese Application No. CN201480035259.8, Office Action dated Nov. 14, 2017, 17 pages (10 pages for the original document and 7 pages for the English translation).
Das et al., Albatross: Lightweight Elasticity in Shared Storage Databases for the Cloud Using Live Data Migration, 37th International Conference on Very Large Data Bases, Proceedings of the VLDB Endowment, vol. 4, No. 8, Available Online at: http://www.cs.ucsb.eduj-suditpojpapers/albatross.pdf, Aug. 29, 2011, 12 pages.
European Application No. EP14745013.4, Office Action dated Apr. 30, 2018, 6 pages.
European Application No. EP14745014.2, Notice of Decision to Grant dated Feb. 22, 2018, 2 pages.
European Application No. EP14745014.2, Office Action dated Jan. 18, 2017, 8 pages.
European Application No. EP14745014.2, Office Action dated Apr. 5, 2017, 9 pages.
European Application No. EP14745015.9, Office Action dated May 14, 2018, 5 pages.
Leite et al., Migratool: Towards a Web-Based Spatial Database Migration Tool, IEEE Computer Society, Proceedings of the 16th International Workshop On Database and Expert Systems Applications, Aug. 22, 2005, pp. 480-484.
Liang et al., Automatic Construction of an Effective Training Set for Prioritizing Static Analysis Warnings, ASE '10 Proceedings of the IEEE/ACM international conference on Automated software engineering, Sep. 20-24, 2010, pp. 93-102.
Miller, How to Score Customer Feedback/Bugs and Stores (for Agile), Configuration Management, May 17, 2013, pp. 1-15.
International Application No. PCT/US2014/040486, International Preliminary Report on Patentability dated Oct. 1, 2015, 18 pages.
International Application No. PCT/US2014/040486, International Search Report and Written Opinion dated Sep. 29, 2014, 11 pages.
International Application No. PCT/US2014/040486, Written Opinion dated Jun. 17, 2015, 7 pages.
International Application No. PCT/US2014/040692, International Preliminary Report on Patentability dated Oct. 8, 2015, 7 pages.
International Application No. PCT/US2014/040692, International Search Report and Written Opinion dated Oct. 8, 2014, 10 pages.
International Application No. PCT/US2014/040692, Written Opinion dated Jul. 16, 2015, 7 pages.
International Application No. PCT/US2014/045226, International Preliminary Report on Patentability dated Jan. 21, 2016, 8 pages.
International Application No. PCT/US2014/045226, International Search Report and Written Opinion dated Oct. 30, 2014, 10 pages.
International Application No. PCT/US2014/045240, International Preliminary Report on Patentability dated Jan. 21, 2016, 8 pages.
International Application No. PCT/US2014/045240, International Search Report and Written Opinion dated Oct. 21, 2014, 10 pages.
International Application No. PCT/US2014/045247, International Preliminary Report on Patentability dated Jan. 21, 2016, 6 pages.
International Application No. PCT/US2014/045247, International Search Report and Written Opinion dated Sep. 3, 2014, 8 pages.
International Application No. PCT/US2014/045282, International Preliminary Report on Patentability dated Jan. 21, 2016, 9 pages.
International Application No. PCT/US2014/045282, International Search Report and Written Opinion dated Sep. 18, 2014, 12 pages.

(56) References Cited

OTHER PUBLICATIONS

International Application No. PCT/US2014/045289, International Preliminary Report on Patentability dated Jan. 21, 2016, 7 pages.
International Application No. PCT/US2014/045289, International Search Report and Written Opinion dated Oct. 15, 2014, 9 pages.
International Application No. PCT/US2014/045721, International Preliminary Report on Patentability dated Jan. 21, 2016, 8 pages.
International Application No. PCT/US2014/045721, International Search Report and Written Opinion dated Nov. 4, 2014, 12 pages.
International Application No. PCT/US2014/045804, International Preliminary Report on Patentability dated Jan. 21, 2016, 8 pages.
International Application No. PCT/US2014/045804, International Search Report and Written Opinion dated Nov. 17, 2014, 12 pages.
International Application No. PCT/US2017/032620, International Search Report and Written Opinion dated Jul. 28, 2017, 15 pages.
To et al., Best Practices for Database Consolidation on Exadata Database Machine, Oracle, Oracle White Paper, Oct. 2013, 35 pages.
Vengurlekar, Best Practices for Database Consolidation in Private Clouds, Oracle, Oracle White Paper, Mar. 2012, 20 pages.
Wilton, A Look at Real Application Testing From a Customer's Perspective, Available online at: http://www.oracle.com/technetwork/oem/gridcontrol/overview/ratcust-perspectives-white-paper-o-132919.pdf, Jan. 1, 2007, 12 pages.
Yu et al., Intelligent Database Placement in Cloud Environment, Web Services (ICWS), 2012 IEEE 19th International Conference On IEEE Computer Society, Jun. 24, 2012, pp. 544-551.
CN Application No. 201480035250.7 received an office action dated Jul. 5, 2018, 12 pages.
CN Application No. 201480035259.8 received an office action dated Jun. 14, 2018, 19 pages.
CN Application No. 201480039080.X received an office action dated Jul. 5, 2018, 19 pages.
CN Application No. 201480039083.3 received an office action dated Jul. 10, 2018, 30 pages.
U.S. Appl. No. 15/175,213 received a Non-Final Office Action dated Jul. 11, 2018, 35 pages.
U.S. Appl. No. 15/250,522, Corrected Notice of Allowability dated Jan. 11, 2019, 3 pages.
Chinese Application No. 201480039070.6, Office Action dated Jan. 14, 2019, 25 pages (10 pages of the original document and 15 pages of the English translation).
European Application No. 14745028.2, Office Action dated Feb. 13, 2019, 6 pages.
U.S. Appl. No. 13/937,885, Final Office Action dated Mar. 21, 2019, 23 pages.
U.S. Appl. No. 13/938,061, Final Office Action dated Mar. 8, 2019, 25 pages.
U.S. Appl. No. 15/175,213, Advisory Action dated Mar. 21, 2019, 5 pages.
Chinese Application No. 201480035250.7, Notice of Decision to Grant dated Mar. 7, 2019, 2 pages.
Chinese Application No. 201480039073.X, Notice of Decision to Grant dated Mar. 26, 2019, 2 pages.
European Application No. 14745012.6, Office Action dated Mar. 5, 2019, 4 pages.
Chinese Application No. 201480035349.7, Office Action dated Apr. 10, 2019, 7 pages (3 pages of Original Document and 4 pages of English Translation).
Chinese Application No. 201480039070.6, Office Action dated Mar. 26, 2019, 21 pages (9 pages of Original Document and 12 pages of English Translation).
U.S. Appl. No. 15/250,522 received a Corrected Notice of Allowability, dated Sep. 27, 2018, 2 pages.
European Application No. 14744404.6, Office Action dated Oct. 15, 2018, 5 pages.
European Application No. 14745029.0 received an Office Action dated Sep. 18, 2018, 8 pages.
European Application No. 18187354.8 received an Extended European Search Report dated Sep. 12, 2018, 6 pages.
Buyukozkan et al., Group Decision Making to Better Respond Customer Needs in Software Development, Computer & Industrial Engineering, vol. 48, Issue 2, Mar. 2005, pp. 427-441.
Laplante et al., Pavlov's Bugs Matching Repair Policies with Rewards, IEEE, vol. 11, Issue 4, Jul.-Aug. 2009, pp. 45-51.
Sharma et al., Predicting the Priority of a Reported Bug Using Machine Learning Techniques and Cross Project Validation, IEEE, 12th International Conference on Intelligent Systems Design and Applications, Nov. 2012, pp. 539-545.
Chinese Application No. 201480039073.X, Office Action dated Jul. 17, 2018, (12 pages of original document and 14 pages of English translation).
Chinese Application No. 201480035250.7, Office Action dated Aug. 3, 2018, (7 pages of original document and 7 pages of English translation).
Chinese Application No. 201430039070.6 office action dated Aug. 6. 2018, 21 pages.
European Application No. EP14736122.4, received a Notice of Decision to Grant, dated Aug. 17, 2018, 2 pages.
U.S. Appl. No. 13/937,885, Non-Final Office Action dated Aug. 10, 2018, 23 pages.
U.S. Appl. No. 13/938,061, Non-Final Office Action dated Aug. 8, 2018, 30 pages.
U.S. Appl. No. 15/250,522, Notice of Allowance dated Aug. 14, 2018, 10 pages.
U.S. Appl. No. 15/789,049, Final Office Action dated Sep. 6, 2018, 6 pages.
U.S. Appl. No. 13/938,061, Advisory Action dated May 24, 2019, 16 pages.
U.S. Appl. No. 15/670,473, Final Office Action dated Jun. 6, 2019, 12 pages.
European Application No. 14745029.0, Summons to Attend Oral Proceedings dated Apr. 25, 2019, 12 pages.
CN201480035259.8, Office Action dated Dec. 3, 2018, 15 pages.
CN201480039073.X, Office Action dated Dec. 10, 2018, 6 pages.
CN201480039083.3, Office Action dated Dec. 10, 2018, 6 pages.
EP14745029.0, Office Action dated Sep. 18, 2018, all pages.
PCT/US2017/032620, International Preliminary Report on Patentability dated Dec. 20, 2018, 10 pages.
U.S. Appl. No. 15/670,473, Non-Final Office Action dated Dec. 18, 2018, 12 pages.
U.S. Appl. No. 15/789,049, Notice of Allowance dated Nov. 15, 2018, 5 pages.
U.S. Appl. No. 15/175,213 received a Final Office Action dated Jan. 10, 2019, 33 pages.
CN Patent Application No. CN201480039070.6, Office Action dated Jul. 31, 2019, 20 pages.
U.S. Appl. No. 13/937,885, Advisory Action dated Jul. 31, 2019, 17 pages.
Chinese Application No. 201480035349.7, Office Action dated Sep. 4, 2019, 8 pages (3 pages of Original Document and 5 pages of English Translation).
U.S. Appl. No. 15/175,213, Non-Final Office Action dated Sep. 19, 2019, 33 pages.
U.S. Appl. No. 15/670,473, Notice of Allowance dated Sep. 18, 2019, 8 pages.

\* cited by examiner

AUTOMATED DATABASE MIGRATION ARCHITECTURE

CROSS-REFERENCES TO RELATED APPLICATIONS

The present application is a continuation of U.S. patent application Ser. No. 13/937,868, filed Jul. 9, 2013, the entire contents of which are hereby incorporated by reference for all purposes. The present application is also related to the following co-pending and commonly assigned U.S. Patent Applications:

U.S. patent application Ser. No. 13/937,977, filed Jul. 9, 2013 by Higginson and entitled "METHOD AND SYSTEM FOR REDUCING INSTABILITY WHEN UPGRADING SOFTWARE;"

U.S. patent application Ser. No. 13/938,061, filed Jul. 9, 2013 by Davis and entitled "CONSOLIDATION PLANNING SERVICES FOR SYSTEMS MIGRATION;"

U.S. patent application Ser. No. 13/938,066, filed Jul. 9, 2013 by Davis and entitled "MIGRATION SERVICES FOR SYSTEMS;"

U.S. patent application Ser. No. 13/937,885, filed Jul. 9, 2013 by Higginson et al. and entitled "DATABASE MODELING AND ANALYSIS;"

U.S. patent application Ser. No. 13/937,344, filed Jul. 9, 2013 by Raghunathan et al. and entitled "CLOUD SERVICES LOAD TESTING AND ANALYSIS;"

U.S. patent application Ser. No. 13/937,483, filed Jul. 9, 2013 by Raghunathan et al. and entitled "CLOUD SERVICES PERFORMANCE TUNING AND BENCHMARKING;"

U.S. patent application Ser. No. 13/937,988, filed Jul. 9, 2013 by Buehne et al. and entitled "SOLUTION TO GENERATE A SCRIPTSET FOR AN AUTOMATED DATABASE MIGRATION;"

U.S. patent application Ser. No. 13/937,545, filed Jul. 9, 2013 by Buehne et al. and entitled "ONLINE DATABASE MIGRATION;"

U.S. patent application Ser. No. 13/937,486, filed Jul. 9, 2013 by Buehne et al. and entitled "DYNAMIC MIGRATION SCRIPT MANAGEMENT;" and U.S. patent application Ser. No. 13/937,970, filed Jul. 9, 2013 by Masterson et al. and entitled "ADVANCED CUSTOMER SUPPORT SERVICES—ADVANCED SUPPORT CLOUD PORTAL,"

of which the entire disclosure of each is incorporated herein by reference for all purposes.

BACKGROUND

Data migration may generally include transferring any type of data from one storage device, format, or system to another storage device, format, or system. Data migration is often required when organizations or individuals upgrade computer systems, merge existing systems, replatform operating systems in which the database resides, or transfer data between locations. Generally, data must be extracted from the old system and loaded onto the new system if the existing database operating system is not compatible with a migration that is acceptable to a business. For example, it may be necessary to move data between databases when switching to a new database vendor or upgrading an existing version of a database. This may include physical data migration and may change the underlying data format.

BRIEF SUMMARY

In one embodiment, a method of migrating data from one or more source databases to one or more target databases may be presented. The method may include generating a pre-migration analysis for a plurality of objects stored in the one or more source databases. The method may also include generating a plurality of migration scripts that transfer the plurality of objects from the one or more source databases to the one or more target databases. The method may additionally include generating a migration plan that defines an execution order for the plurality of migration scripts. The method may further include migrating the plurality of objects from the one or more source databases to one or more target databases according to the migration plan. The method may also include validating the plurality of objects on the one or more target databases.

In some embodiments, the one or more target databases may be a single target database, the one or more source databases may be a plurality of source databases, and the plurality of source databases may be migrated to the single target database. The method may also include presenting the pre-migration analysis in a portal display of a cloud service that is remotely located from the one or more source databases and the one or more target databases. The method may additionally include presenting a post-migration report in a portal display of a cloud service that is remotely located from the one or more source databases and the one or more target databases, where the post-migration report may include data resulting from the validating of the plurality of objects on the one or more target databases. The method may further include presenting a real-time migration report in the portal display of the cloud service, where the real-time migration report indicates progress while migrating the plurality of objects from the one or more source databases to one or more target databases according to the migration plan.

In some embodiments, the method may also include receiving one or more manual parameter adjustments during migration, and altering the migration plan during the migration according to the one or more manual parameter adjustments. The pre-migration analysis mat include classifying the plurality objects, identifying installed database options, and identifying complex objects that require special handling during the migration, and reconfiguring the complex objects such that a number of instances where the complex objects are unavailable is reduced. Each of the plurality of objects may be associated with a corresponding one of the plurality of migration scripts. The migration plan may further define which of the plurality of migration scripts can be executed in parallel during migration. The migration plan may further define an execution timing for the plurality of migration scripts. The pre-migration analysis may include information received from a database modeling analysis of a cloud service that is remotely located from the one or more source databases. Validating the plurality of objects on the one or more target databases may include determining a set of invalid objects in the one or more source databases, and determining whether the set of invalid objects were correctly migrated to the one or more target databases. Validating the plurality of objects on the one or more target databases may alternatively or additionally include determining whether a row count from the one or more source databases matches a row count from the one or more target databases.

In another embodiment, a computer-readable memory may be presented. The computer-readable memory may comprise a sequence of instructions which, when executed by one or more processors, causes the one or more processors to migrate data from one or more source databases to one or more target databases. The instructions may cause the processor(s) to generate a pre-migration analysis for a plurality of objects stored in the one or more source databases. The instructions may also cause the processor(s) to generate a plurality of migration scripts that transfer the plurality of objects from the one or more source databases to the one or more target databases. The instructions may additionally cause the processor(s) to generate a migration plan that defines an execution order for the plurality of migration scripts. The instructions may further cause the processor(s) to migrate the plurality of objects from the one or more source databases to one or more target databases according to the migration plan. The instructions may also cause the processor(s) to validate the plurality of objects on the one or more target databases.

In yet another embodiment, a system may be presented. The system may include one or more processors and a memory communicatively coupled with and readable by the one or more processors. The memory may comprise a sequence of instructions which, when executed by the one or more processors, cause the one or more processors to migrate data from one or more source databases to one or more target databases. The instructions may cause the processor(s) to generate a pre-migration analysis for a plurality of objects stored in the one or more source databases. The instructions may also cause the processor(s) to generate a plurality of migration scripts that transfer the plurality of objects from the one or more source databases to the one or more target databases. The instructions may additionally cause the processor(s) to generate a migration plan that defines an execution order for the plurality of migration scripts. The instructions may further cause the processor(s) to migrate the plurality of objects from the one or more source databases to one or more target databases according to the migration plan. The instructions may also cause the processor(s) to validate the plurality of objects on the one or more target databases.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

FIG. 13 illustrates a portal interface for viewing source and/or target databases, according to one embodiment.

FIG. 15 illustrates a portal interface for viewing the results of a database migration, according to one embodiment.

FIG. 16 illustrates a portal interface for determining if objects are missing after the migration, according to one embodiment.

DETAILED DESCRIPTION

Figure 1:
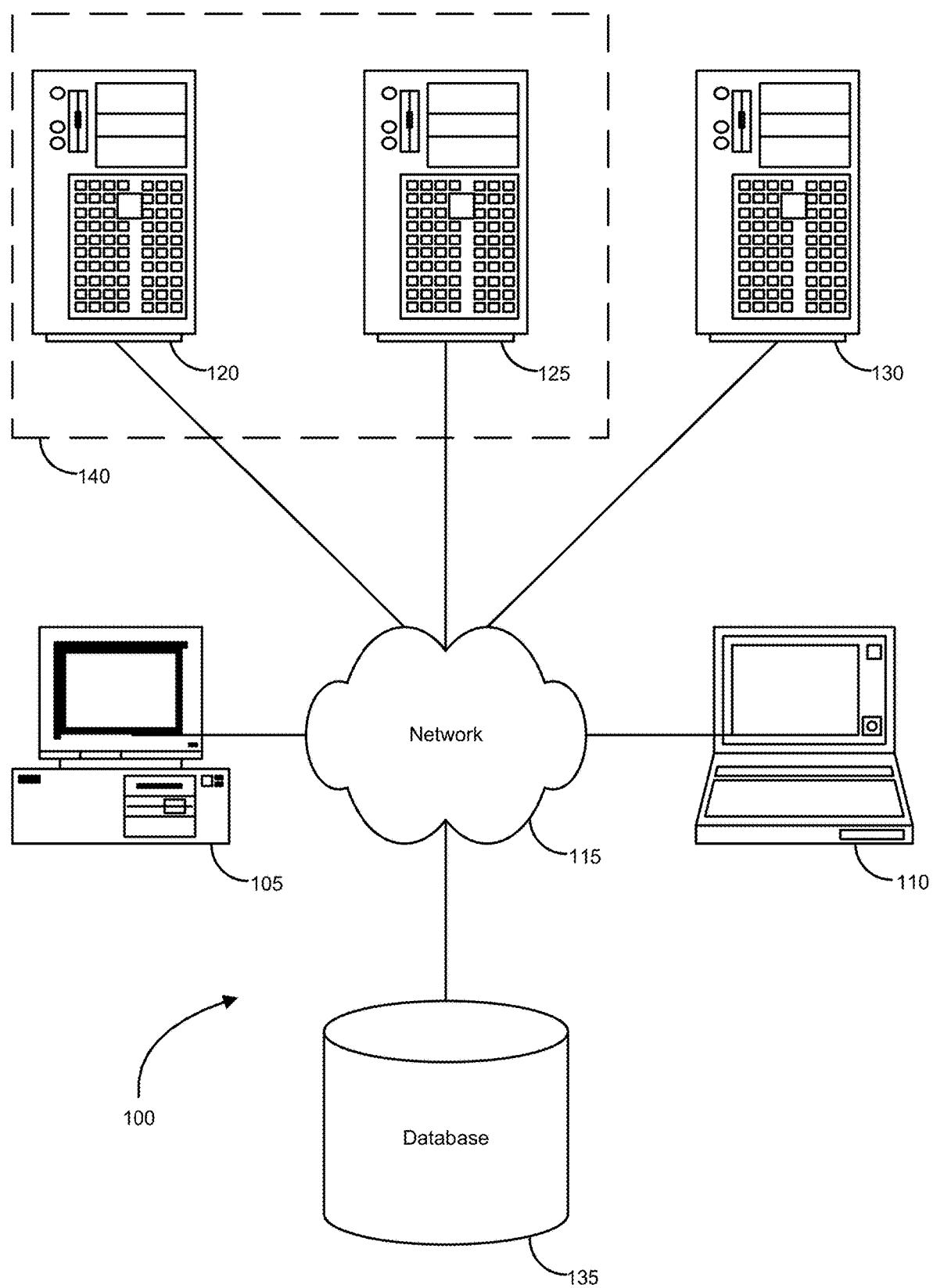
FIG. 1 illustrates a block diagram of components of an exemplary operating environment in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Each of the embodiments disclosed herein may be implemented in a general-purpose computer system. FIG. 1 is a block diagram illustrating components of an exemplary operating environment in which various embodiments of the present invention may be implemented. The system 100 can include one or more user computers 105, 110, which may be used to operate a client, whether a dedicated application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk, and the like. Merely by way of example, the network 115 may be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 9i, 10g, 11, etc., that is adapted to store, update, and retrieve data in response to SQL-formatted commands.

Figure 2:
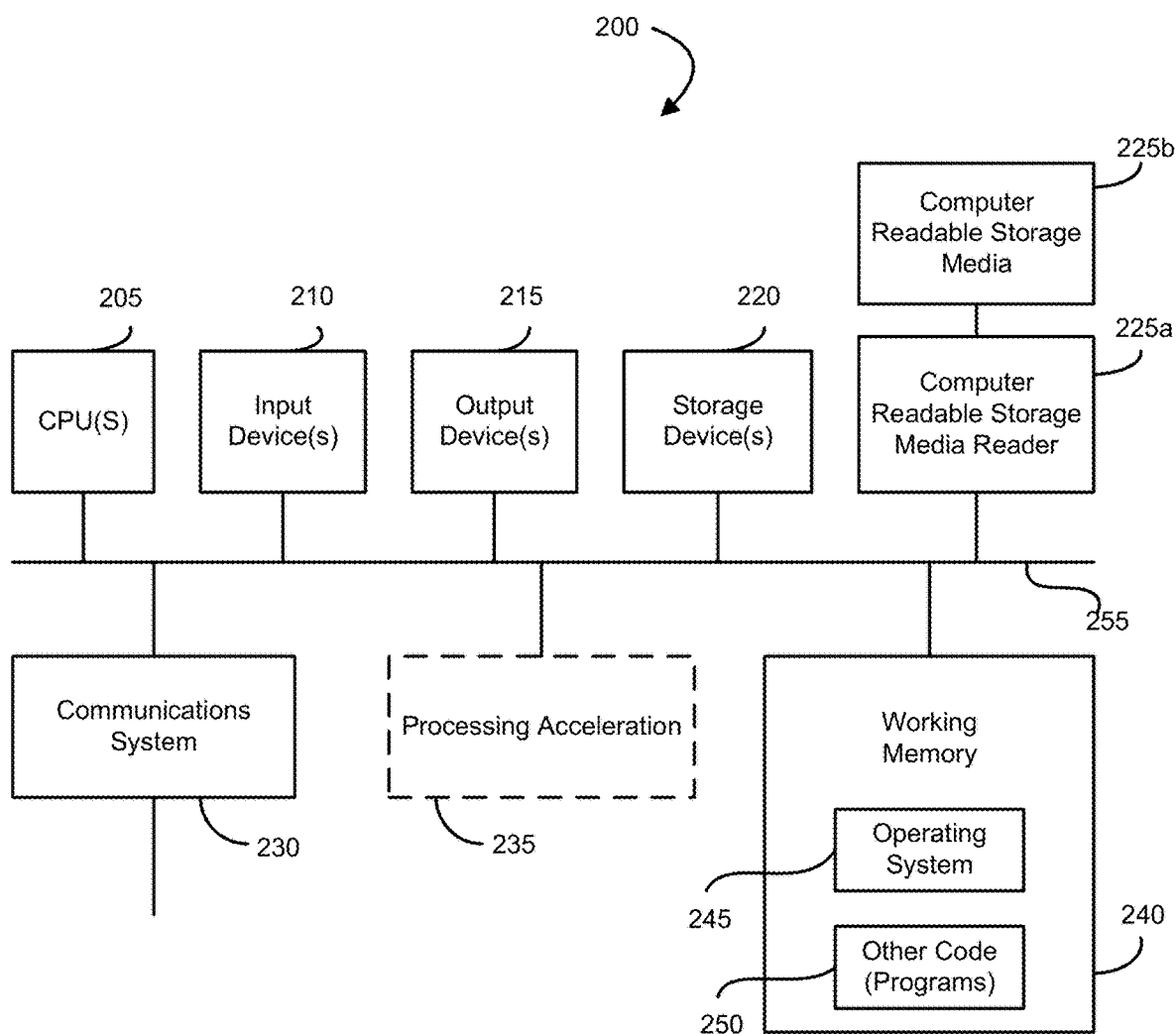
FIG. 2 illustrates a block diagram of an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

Each of the methods described herein may be implemented by a computer system, such as computer system 200 in FIG. 2. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed by the computer without human intervention. Therefore, it will be understood in light of this disclosure, that each step and each method described herein may be altered to include an input and output to and from a user, or may be done automatically by a computer system. Furthermore, some embodiments of each of the methods described herein may be implemented as a set of instructions stored on a tangible, non-transitory storage medium to form a tangible software product.

As with nearly all software-based systems, database systems are often required to undergo periodic upgrades in order to take advantage of new computing technologies. During the migration process, a customer may wish to migrate one or more old database systems over to new database systems. Migration may be needed because software or hardware becomes obsolete, or because the advantages offered by newer database systems may provide cost savings or other business advantages.

A "source database" may refer to a grouping of one or more computer systems that stores and executes a database installation. The source database may fulfill retrieval, update, and other forms of database queries. A "migration" may refer to moving or copying objects in one or more source databases to one or more target databases. Therefore, prior to migration, the database installation may only be available on the source database(s). Following the migration, the database installation may be present on the target database(s) and, possibly, still present on the source databases. The "target databases" may refer to a grouping of one or more computer systems that stores the database installation after the migration. The target databases may execute the database installation and fulfill retrieval, update, and other forms of database queries following the migration.

A migration can involve multiple steps. First, the source databases and the target databases may be subjected to a pre-migration analysis. This analysis may be useful for categorizing objects, identifying objects that require special handling during migration, identifying invalid objects, analyzing the usage and criticality of objects, and/or the like. The source system analysis may also identify large database objects that need further configuration to achieve efficiencies and storage using existing technologies, such as partitioning and compression. The pre-migration analysis may use data collected from a cloud-based database modeling service to help the customer configure a migration plan that minimizes downtime, maximizes transfer speeds, and ensures data integrity and validation (ensuring that all of the data has been transferred). The migration plan may include a plurality of migration scripts that can be executed in parallel, reordered, scheduled, and configured as to the sources, targets, compression, partitioning, ownership, and/or location of the data. According to the migration plan and customer parameter inputs.

Second, the source databases may need to be copied from a source server system to target databases residing on the target server system. Such databases and associated data storage elements may rage from small to very large (e.g., hundreds of gigabytes or terabytes). Copying of the database objects from the source databases to the target databases may be performed while the source server system is offline, and thus not processing requests and/or updating database entries. However, in some embodiments, copying may occur while the source server system is online, and is processing requests and/or updating database entries. Some embodiments allow a customer to control the timing and online-status of the migration in order to minimize disruptions to the customer's business activities. Online database migration may also be accomplished using technologies such as Goldengate and/or DataGuard provided by Oracle®.

Next, after a database has been copied from the source server system to the target server system, one or more indexes may be generated for the database copied to the target server system. Such indexes may allow for faster and/or more efficient querying of the database at the target server system. Rather than copying previously-created index files from the source server system to the target server system, it may be more efficient to ignore the index files of the source server system and have the target server system generate its own index files. It should be noted that in some embodiments, the new database may use a completely different configuration with compressions, partitioning, and/or parallelism.

Lastly, after a database has been copied to the target server system, a customer may expect at least some level of verification to be performed on the database at the target server system to ensure the copy was performed correctly and/or fully. In some embodiments, a row count of the copied database as stored by the target server system may be compared with a row count of the database as stored by the source server system. If the row counts match, the customer can be at least assured that no records were lost during the migration. Other embodiments may compare invalid object counts. Additionally, some embodiments may also report on any database objects where the validation failed, and thus assist in the diagnosis of application errors should an application query a table that has been copied to the target system with missing data rows. In this case, a migration engineer may be able to quickly resolve the error due to missing data at the time of migration rather than discovering this error during normal operations.

Unfortunately, if customers were to manually perform a pre-migration analysis, generate a migration plan, monitor and execute the migration plan, migrate the data, and generate a post-migration report this process could take many weeks to perform and would be prone to errors and data corruption. Therefore, some embodiments presented herein are designed to migrate data from source databases to target databases using a cloud-based service. A cloud data center is able to remotely interact with a customer data center to analyze the customer systems, generate the migration plan, and provide an interactive interface that gives customers control over the migration in real-time through a cloud-based portal. The migration and data analysis may be carried out by a gateway installed as an integrated part of the customer system. The gateway may communicate with the cloud data center and the portal in order to govern and report on the migration process. Using project management terminology, this feature may provide a "quality gate" to give customers confidence in the status of the migration project through the portal reporting.

Embodiments described herein may utilize an existing Enterprise Manager to consistently and/or periodically monitor and model the customers database systems. An Enterprise Manager agent may be employed to collect and monitor modeling data associated with the customer's databases. Additionally, customer configurations such as EM plugins or custom collectors that interrogate and analyze source and/or target systems may be used. This information may be uploaded to a cloud service through a gateway that resides on a customer's Enterprise Manager system. The cloud service can then perform calculations and analysis on the data recorded by the agent in order to provide data for specific migration scenarios. Additionally, engineers may be provided with other analyses relevant to database migration, such as security considerations, data integrity considerations, data criticality considerations, and/or the like.

Figure 3:
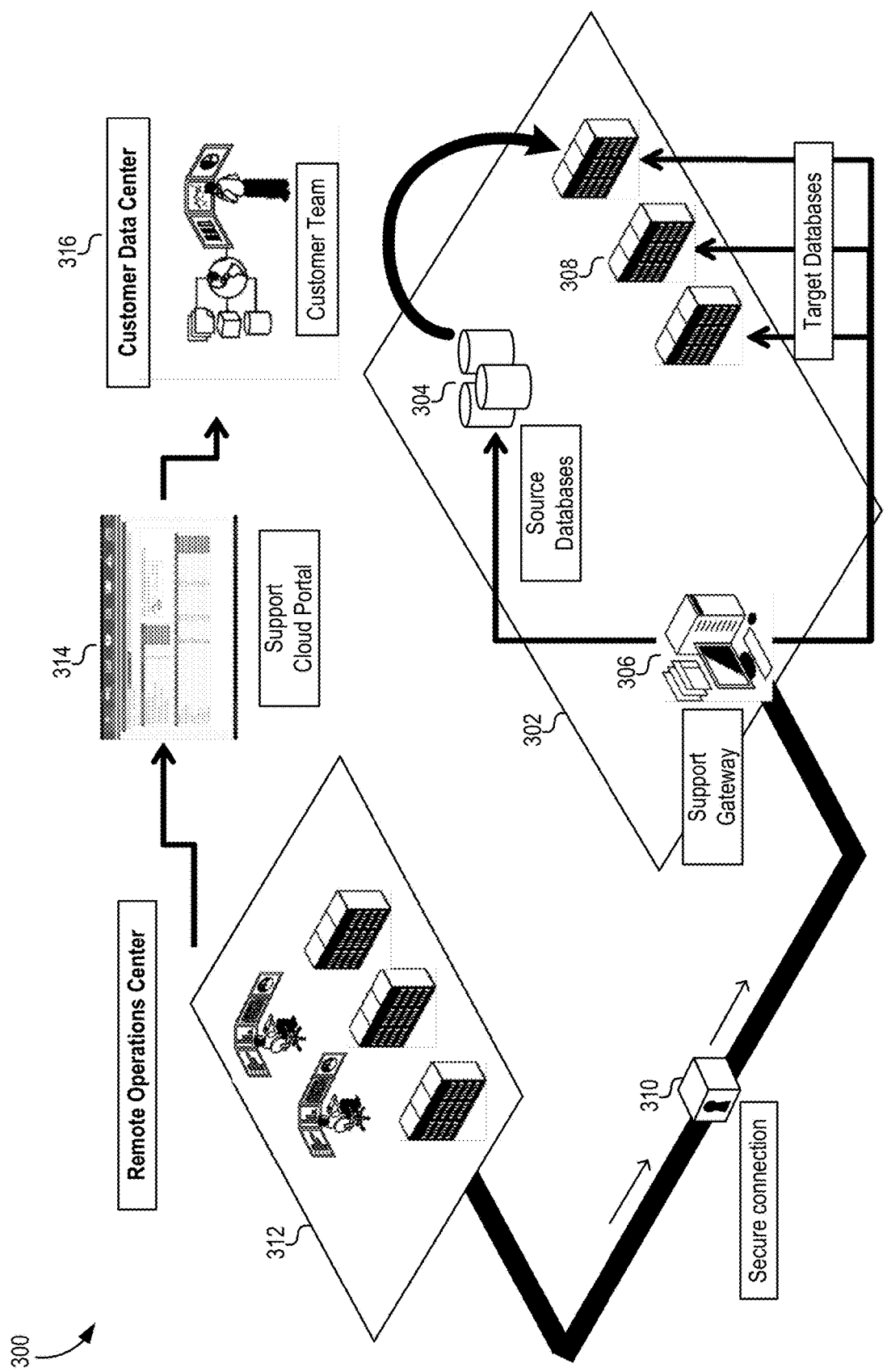
FIG. 3 illustrates a block diagram of a cloud-based environment for providing support to a customer through a gateway, according to one embodiment.

FIG. 3 illustrates a block diagram of a cloud-based environment for providing support to a customer through a gateway, according to one embodiment. A customer IT infrastructure 302 may house one or more source databases 304 as well as one or more target databases 308. For large enterprises, the customer IT infrastructure 302 may be geographically distributed across multiple locations. For smaller customers, the customer IT infrastructure 302 may be located in a single facility as shown in FIG. 3. In this particular embodiment, the target databases 308 may be operated by the customer. For example, the target databases 308 may reside in the same server room as the source databases 304.

In another embodiment, the target databases 308 may be located remotely. Although not shown explicitly in FIG. 3, the target databases 308 may be operated by a cloud storage facility. This type of migration may relieve the customer from the responsibility of operating and maintaining the target databases 308. In some embodiments, the target databases 308 may may be co-located with or co-operated by the same entity providing the cloud migration service described below. For example, the target databases 308 may be integrated with the remote operations center 312 of the cloud service.

In order to interface with the cloud support system and the services available thereby, the customer IT infrastructure 302 may include a gateway 306 provided by the cloud support service and operating locally on the customer systems. An Enterprise Manager may be implemented as a specialized module within the gateway 306. As used herein, the gateway 306 may refer to any module that has access to the source databases 304 and can provide statistics and information regarding the source databases 304 to a remote operations center 312 of the cloud support service. The gateway may collect information from the source databases 304, including data objects to be migrated to the target databases 308, source/target information, and OS configurations, and may transmit such information to both the target databases 308 and the remote operations center 312.

In some embodiments, the support gateway 306 may collect performance information and configuration data related to the source and/or target databases 304, 308, and the remote operations center 312 may then use that performance information to perform a pre-migration analysis, generate migration scripts, and generate a migration plan that are customized for the customer IT infrastructure 302. As will be described below, the customer may be be able to provide and/or adjust parameters that influence the migration plan in order to customize the database migration. The remote operations center 312 may provide an interface referred to herein as a "cloud portal," "support cloud portal," and/or "portal" 314. The portal 314 may present the customer with an interface to select the source/target databases 304, 308, view the migration plan and pre-migration analysis, provide parameters to adjust the migration plan, and review the final migration plan before migration begins.

In some embodiments, the remote operations center 312 may perform the pre-migration analysis, generate the migration scripts, and/or generate the migration plan in the background in a manner that is transparent to the customer. In some embodiments, the support gateway 306 may periodically transmit performance information to the remote operations center 312, which can generate preemptive migration plans and pre-migration analyses that may be accessed at any time by the customer. In other embodiments, the gateway 306 may alternatively generate the pre-migration analysis, migration scripts, and migration plan on demand in response to a customer request for data migration. These reports may act a as migration status report.

The portal 314 may include interfaces that allow a customer to begin the migration process, and constantly monitor the migration process in real time. Customers may need to adjust the migration process by altering the timing, ordering, or scheduling of the migration scripts in the migration plan according to business needs. For example, a customer may need to keep some of the source databases 304 online during certain hours, and may submit parameters that adjust the migration plan accordingly. The portal 314 may be transmitted to a customer data center 316 where a customer engineer may monitor the portal on a display device. The customer data center 316 may be co-located with the customer IT infrastructure 302, or may be remotely located from both the remote operations center 312 and/or the customer IT infrastructure 302. For example, the customer data center 316 may be outsourced to a third party. Following the conclusion of the migration process, a customer team in the customer data center 316 may use the portal 314 to view a post-migration analysis and validation of the process.

It should be emphasized that traditionally database migration has been a very manual exercise. Depending on the size and complexity of the systems, this process may involve 6 to 8 weeks of complex analysis and planning by customer engineers, and may increase significantly for very complex systems or for inexperienced customers. Once the migration began, there was no way to monitor the progress and make real-time adjustments as needed. The cloud support service depicted in FIG. 3 automates this process such that the pre-migration analysis, migration, and post-migration validation can be carried out in minutes or hours instead of weeks or months. Additionally, the difficult process of generating migration scripts and managing the timing and order of their execution can be automated by the cloud service. Because these operations can be performed remote from the customer IT infrastructure 302, the entities providing the cloud support service can service many different customers from many different geographic locations from the remote operations center 312 at once. The portal 314 can provide a snapshot of a customer's data, configurations, and complexities, and allow them to customize a migration plan according to their own business needs.

FIG. 3 depicts different entities operating in different locations in a block diagram format. It will be understood that each of these entities (the remote operations center 312, the customer IT infrastructure 302, the customer data center 316, etc.) may each be remotely located from each other. As used herein, the term "remotely located" will be understood to mean geographically remote or geographically removed. Entities that are remotely located from each other will typically be located in separate facilities many miles away from each other. For example, entities that are remotely located from each other may be separated by distance of at least 5 miles, 10 miles, 15 miles, 100 miles, and/or the like.

Figure 4:
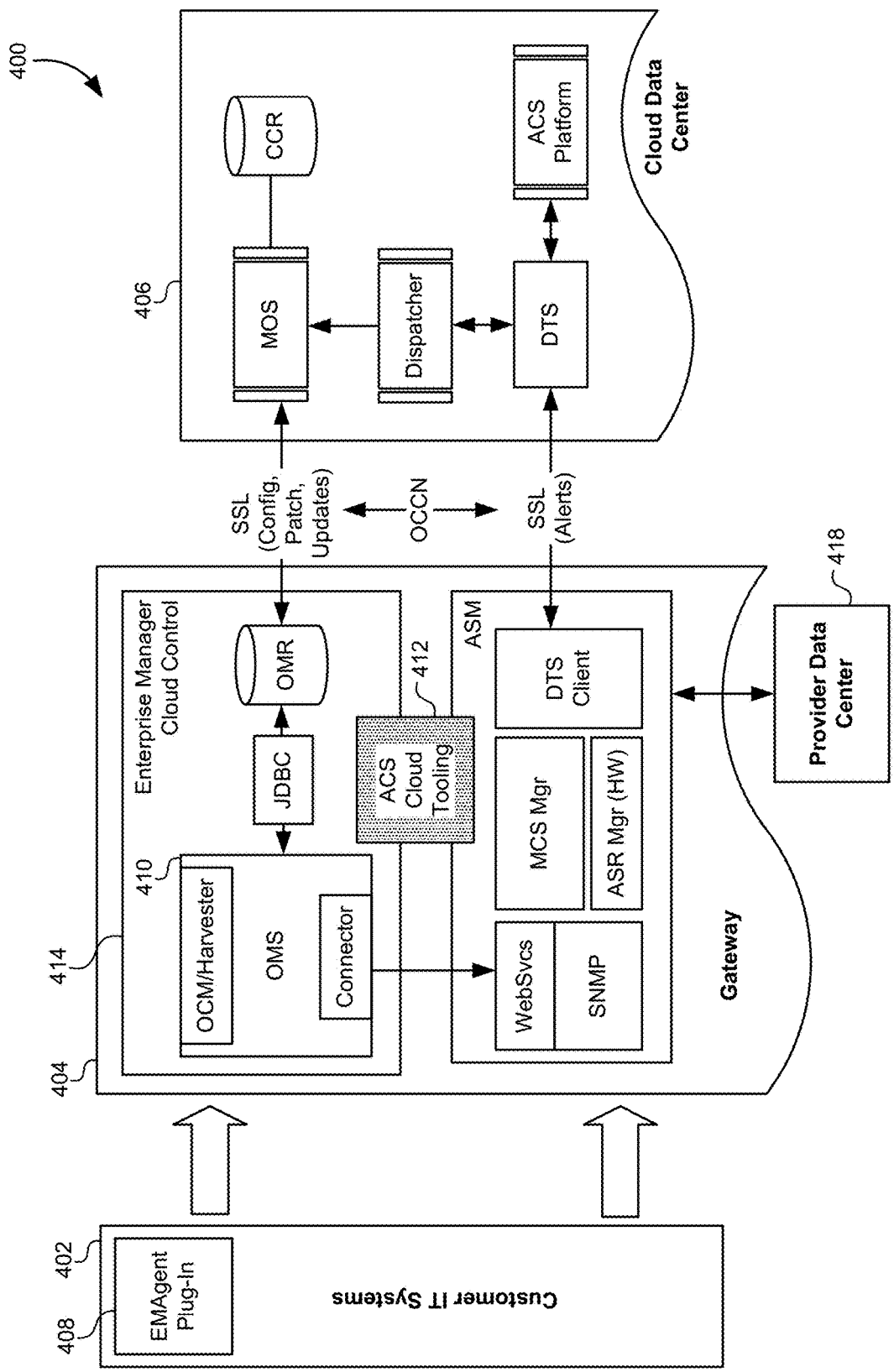
FIG. 4 illustrates a block diagram of a gateway, according to one embodiment.

One of the elements of the cloud support service is the gateway 306 that communicates with the remote operations center 312 through a secure connection 310. FIG. 4 illustrates a block diagram of a gateway, according to one embodiment. By being installed with the customer system, a gateway 404 may be able to access the customer IT systems 402 using one or more agent plug-ins 408. For example, the gateway 404 may collect, format, and store information that is normally collected by an enterprise manager 414.

The gateway 404 may use the customer's existing database estate as an input. For example, a customer IT system 402 may be used and may include multiple environments such as development, test, and production environments, databases, and/or the like. In many cases, databases in the customer IT system 402 may be implemented with legacy hardware that is no longer considered state-of-the-art or in a system that is no longer supported as a platform or as a currently-supported software version, thus prompting the database migration to more advanced database systems.

In some embodiments, the gateway 404 may be designed to be proactive, in that it is performed in the background during normal operations. The results of pre-migration analysis performed proactively may be used to plan the actual database migration plan. For example, the gateway 404 may analyze source databases and/or target databases systems prior to a customer request. One key benefit of this preemptive service is the ability to model and size database migration scenarios that group together similar systems based on behaviors, configurations, and/or outputs. The grouping of similar systems may be done in accordance with a set of best practices as identified by the customer. A grouping may also be based on the Recovery Time Objective (RTO) as specified by the customer. By performing this analysis in advance of the actual database migration process, this assessment phase may greatly reduce the rising costs to resolve migration problems or outages that may impact customers in financial, regulatory, or reputational ways.

In order to collect performance data, the agent 408 may be deployed on the customer IT system 402. For example, an Enterprise Manager Agent may be installed as a collector that gathers information in response to detected events, such as a database going offline. Peak events that consume resources that may impact a migration. Specific configuration data on a source/target database or OS may also impact a migration. These agents may be configured to provide performance data to an Enterprise Manager 414. The collected data may be selected so as to provide relevant database metrics for the pre-migration analysis process. For example, the agent 408 may be focused on capturing a production workload for a selection of databases such that they can be mapped to a destination environment on a newer, more efficient platform.

The agent 408 may send performance data collected from the customer IT system 402 to the gateway 404. In some embodiments, the collected data may be sent to the Enterprise Manager Cloud Control 414 that resides within the gateway. The gateway 404 may be configured to operate on a customer system as a control point for managing how internal users and/or application assets are exposed to outside systems. The gateway 404 may provide access security, data security, auditing and monitoring capabilities, and/or integration with external systems. In one embodiment, the gateway 404 may provide access to a provider data center 418 and a cloud data center 406 that are remotely located away from the customer IT system 402. The cloud data center 406 may be operated by a provider of databases and software used by the customer IT system 402.

The gateway 404 may include a type of Enterprise Manager 414 that is configured to operate in conjunction with the cloud data center 406. A cloud tooling module 412 may operate with the enterprise manager 414 to extract and/or modify data that is already being collected by the enterprise manager 414 during or type of operations. The data collected and/or modified by the cloud tooling module 412 may be selected as being relevant to analyzing database operations. These data may then be provided to the cloud data center 406 for processing. In some embodiments, the gateway 404 may operate in a manner that is transparent to the customer. Data for use in database migration may be collected in the background during normal operations and stored at the provider data center 418.

Figure 5:
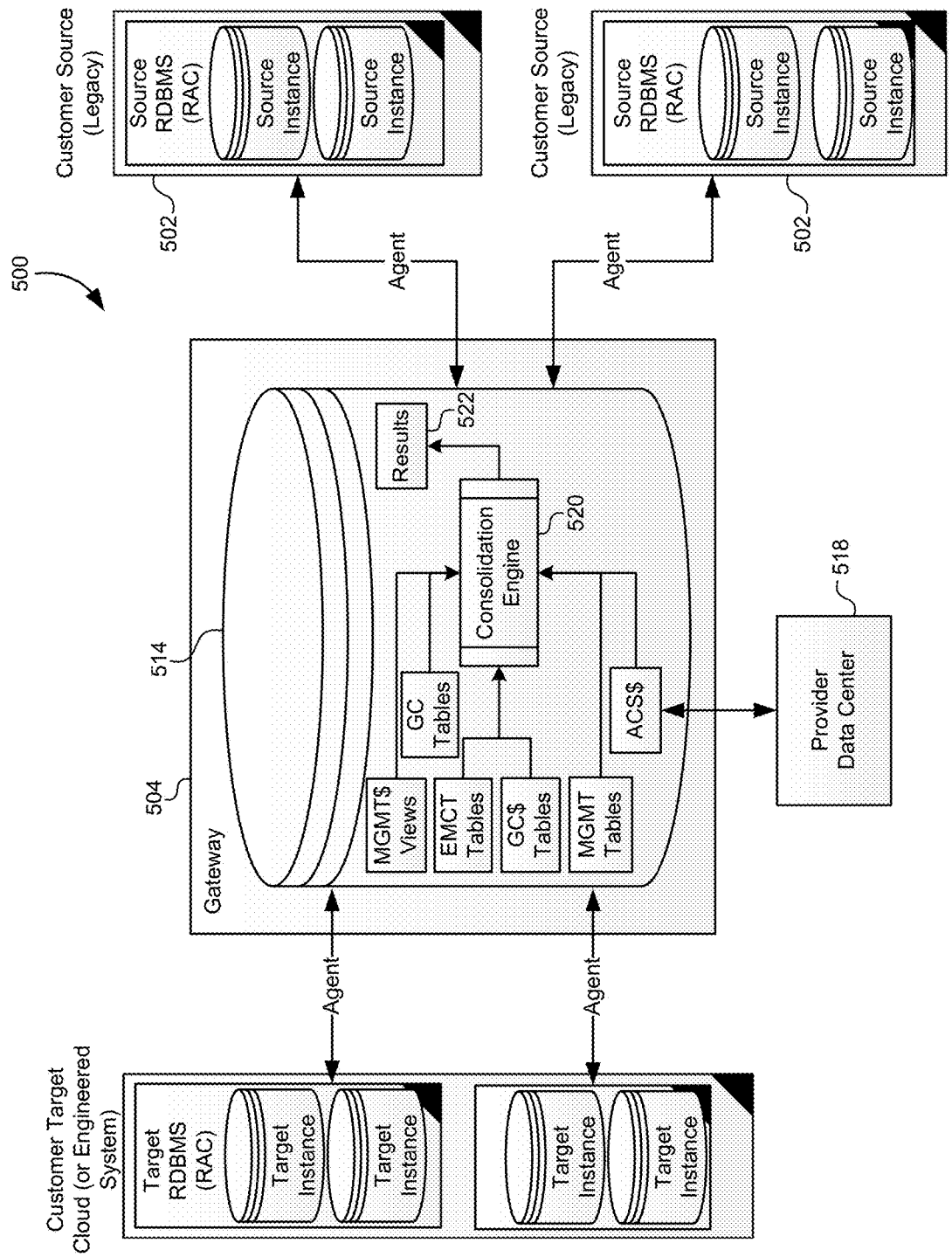
FIG. 5 illustrates a block diagram of a gateway during database migration, according to one embodiment.

FIG. 5 illustrates a block diagram of a gateway during database migration, according to one embodiment. As described above, the gateway 504 may operate in an Enterprise Manager to record data that are relevant to database migration during normal operations. The gateway 504 may include a data store 514 that is configured to store information associated with the performance of a set of legacy systems 502. The legacy systems 502 may include a large number of source databases that are operated using a relational database management system (RDBMS). An agent installed on the legacy systems 502 may provide information to the gateway 504 that is stored in the data store 514. In some embodiments, the data store 514 may be populated continuously with data during normal operations of the legacy systems 502.

A special consolidation engine 520 may read information from various tables in the data store 514, such as management tables, garbage collection tables, read/write logs, and/or the like. Note that this allows the consolidation engine 520 to have historical performance data always on hand. Therefore, when a customer creates a migration scenario, the migration scenario can be analyzed and prepared using historical data rather than needing to collect future data in order to complete the analysis. For example, data retrieved from the "MGMT$" tables can be crunched via the consolidation engine 520, and the results may be stored in a special results table 522 ready to be shipped back to the provider data center 518.

The consolidation engine 520 may extract the data from existing tables and fit the data into a new data model. In some embodiments, as the Enterprise Manager populates tables in the data store 514, the consolidation engine 520 may detect the changes and automatically use the data to populate the new data model. In some embodiments, the consolidation engine 520 may instead wait until a migration scenario is provided by a user before translating data from the old format into the new data model. The new data model may include data from many different databases within the data store 514. One having skill in the art would understand that many different types of data models may be used according to the needs of each particular implementation.

Figure 6:
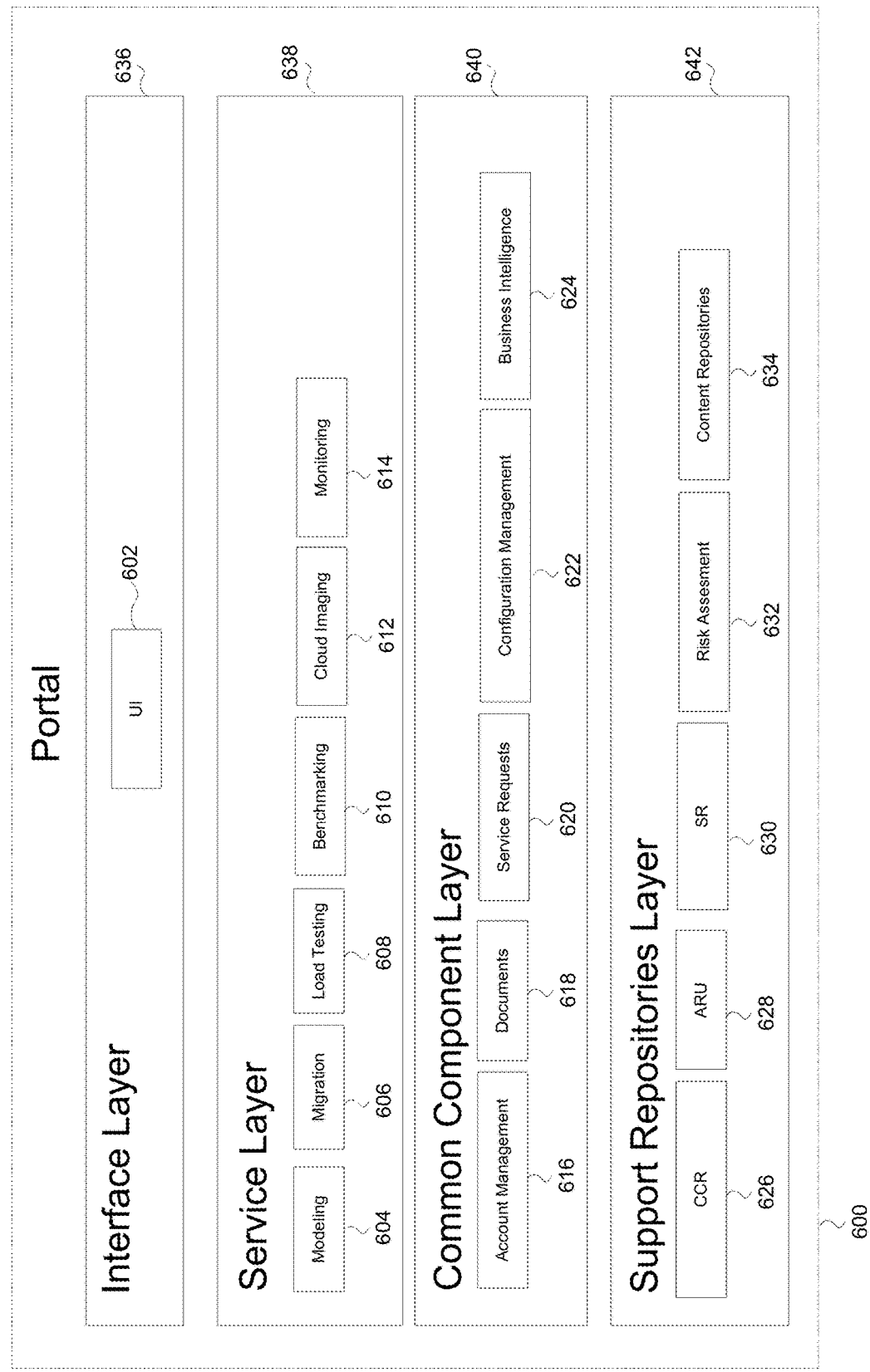
FIG. 6 illustrates a block diagram of a portal provided by a cloud service for database migration, according to one embodiment.

FIG. 6 illustrates a block diagram of the structure of a portal 600. The portal 600 may be based on a layered architecture. The portal may be divided into four layers: an interface layer 636, a service layer 638, a common component layer 640, and a support repositories layer 642. These layers may be responsible for the handling of service and customer information and the presentation and orchestration of services on the server side. The layers may be used to interface and communicate with the gateway residing and operating on the customer systems, enable remote administrators to interact with the gateway to deliver service, and/or enable customers to receive service via the portal to collaborate with the service provider.

The backend of the portal may include a support repositories layer 642. The support repositories layer 642 may be used to leverage various sources of data to enrich and/or deliver services. The support repositories layer 642 may include repositories or access to repositories that may include configuration, patch, SR information or data, and/or the like.

The backend of the portal may further include a common component layer 640. Elements of the layer 640 may include components that are used in support of services during and after deployment. Elements may include an account management module 616 that provides authentication, authorization, and security to the portal and to the service. Customers may be provided access to the portal, and also granted access/entitlement to one or more services. The layer 640 may further include a documents module 618 which provides the methods for managing documents using the portal. Furthermore the layer 640 includes a service request module for managing the various requests and steps used in the delivery of a service. A configuration management module 622 may be used to manage the configurations associated with a customer. A business intelligence module 624 may be used to identify high value information.

The service layer 638 of the portal 600 may include specific modules and functions required for each service. Each type of service may include defined workflow, logic, security, and/or the like. Each type of service may include a module for managing the special workflow, logic and other requirements for the service. Modules for modeling 604, migration 606, load testing 608, benchmarking 610, cloud imaging 612, and/or monitoring 614 may be implemented in the layer 638.

Finally, the interface layer 636 of the portal 600 provides a user interface (UI), such as a graphical user interface 602, that may be used by the customer, service provider, and/or administrator. The interface layer represents the presentation layer for the services. The user interface 602 of the interface layer 636 may be a responsive web design and, as such, may work on multiple devices (e.g. a desktop, a smart phone, a tablet, etc.). The UI of the portal may provide a common service interface for the services and/or content. The UI may present available, installed, active, or support cloud services in a consistent interface with a similar look and feel. Common user interface components may be used. Navigation methodology may be based on rich service summary reporting with drill-down options for more detail. Services may be tightly coupled with customer configurations. Technical data required for service delivery (analysis, verification, reporting) may be collected automatically. Analytics may be used extensively to help reduce information overload by creating "easy to consume" dashboards and reports. It should be noted that other database lifecycle services may also be offered through the portal in addition to database migration. Therefore, the data collected and analyses performed for a database migration may be shared with other database lifecycle services and vice versa. This increases data reuse and shrinks the data footprint of the cloud support service.

Figure 7:
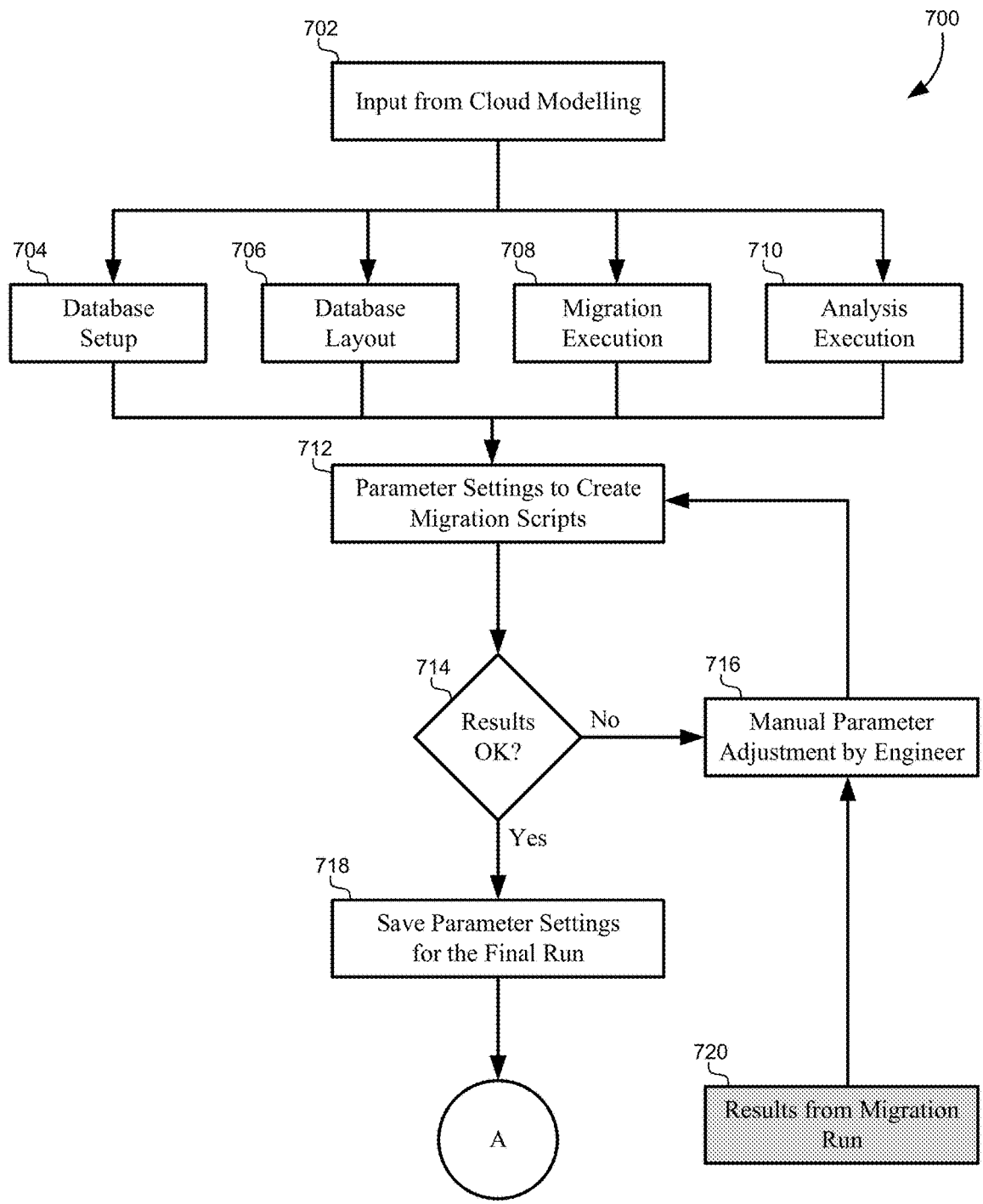
FIG. 7 illustrates a flowchart of a method for performing a pre-migration analysis and generating a migration plan, according to one embodiment.

FIG. 7 illustrates a flowchart 700 of a method for performing a pre-migration analysis and generating a migration plan, according to one embodiment. The pre-migration analysis may be used to analyze the source databases and to identify ways in which they can be reconfigured on the target databases in order to optimize performance. In some embodiments, the method for performing pre-migration analysis may receive inputs from a cloud modeling service. This service allows users to specify target and source databases, and as a result, the modeling service provides an analysis of how the data objects on the source system can be configured to operate on the target database systems. For example, the modeling service may provide recommendations that certain databases should be combined onto a single system, such as an Exedata system from Oracle™. This may be part of a Platform-as-a-Service (PaaS) and/or a Database-as-a-Service (DaaS) product, where the cloud service can combine several databases into a single database on a managed platform. It will be understood that any aspect of the cloud modeling service may be used as part of the pre-migration analysis. The full details of the cloud-based modeling service are described in the co-assigned U.S. patent application Ser. No. 13/937,885, entitled "Database Modeling and Analysis for Prospective Migration" and filed concurrently with the present application on Jul. 9, 2013, the entire disclosure of which is hereby incorporated by reference for all purposes.

The pre-migration analysis may analyze and configure the database setup 704, the database layout 706, migration execution step 708, and the execution of post-migration analysis 710. In some embodiments, the pre-migration analysis may also include identification and classification of a plurality of objects stored within the source databases. For example, the pre-migration analysis may identify invalid objects in the source databases that can be verified against invalid objects in the target databases after migration has taken place. The pre-migration analysis may also identify exceptionally large database tables that may need to be subdivided into smaller units and/or compressed. The pre-migration analysis may also identify objects associated with security requirements, maximum offline requirements, data integrity requirements, redundancy requirements, and/or the like that would require special handling during the migration procedure.

The pre-migration analysis may also identify database options in the source databases and determine how to translate those options to the target databases. For example, source databases may include an automatic storage management (ASM) feature, and the options thereof may need to be configured to run on the target database system. This also allows for a source system that does not use ASM to use ASM in the target database configuration. The pre-migration analysis may also provide for compression, encryption, and/or other data transformation options that may be recommended to users or required by the target database systems. For example, the pre-migration analysis may provide space and cost savings that may be attained by implementing a particular data compression scheme.

The pre-migration analysis may result in a plurality of parameters being specified that may be used to create migration scripts 712. These parameters may include constraints on when and/or how particular data objects in the source databases may be migrated to the target databases. If the resulting migration scripts are acceptable 714, the parameter settings may be saved for a subsequent migration run 718. However, the portal may provide the results of the pre-migration analysis to a customer, who may then adjust the parameters manually 716 in order to achieve the desired migration scripts and/or plan. In some embodiments, results from previous migration runs may also be analyzed and incorporated by the customer to adjust the parameters for the current migration plan 720.

As mentioned above, the pre-migration analysis may include generating migration scripts. One advantageous method of preparing for a database migration is to "slice and dice" the source databases into small manageable chunks. In some embodiments, the source databases may be divided into individual objects, and each individual object may be associated with its own migration script. A migration script may include instructions or parameters used to migrate the associated object(s) from the source databases to the target databases. By generating migration scripts, the process of migration may be not only simplified, but it may also be more modular in its execution. Scripts can be executed in different orders, and many scripts may also be executed in parallel. By breaking a large database down into many small scripts that can be executed in parallel, large databases can be migrated in a fraction of the time that would have been required prior to this disclosure. The full details generating migration scripts are described in the co-assigned U.S. patent application Ser. No. 13/937,988, entitled "Solution to Generate a Script Set for an Automated Database Migration" and filed concurrently with the present application on Jul. 9, 2013, the entire disclosure of which is hereby incorporated by reference for all purposes.

Figure 8:
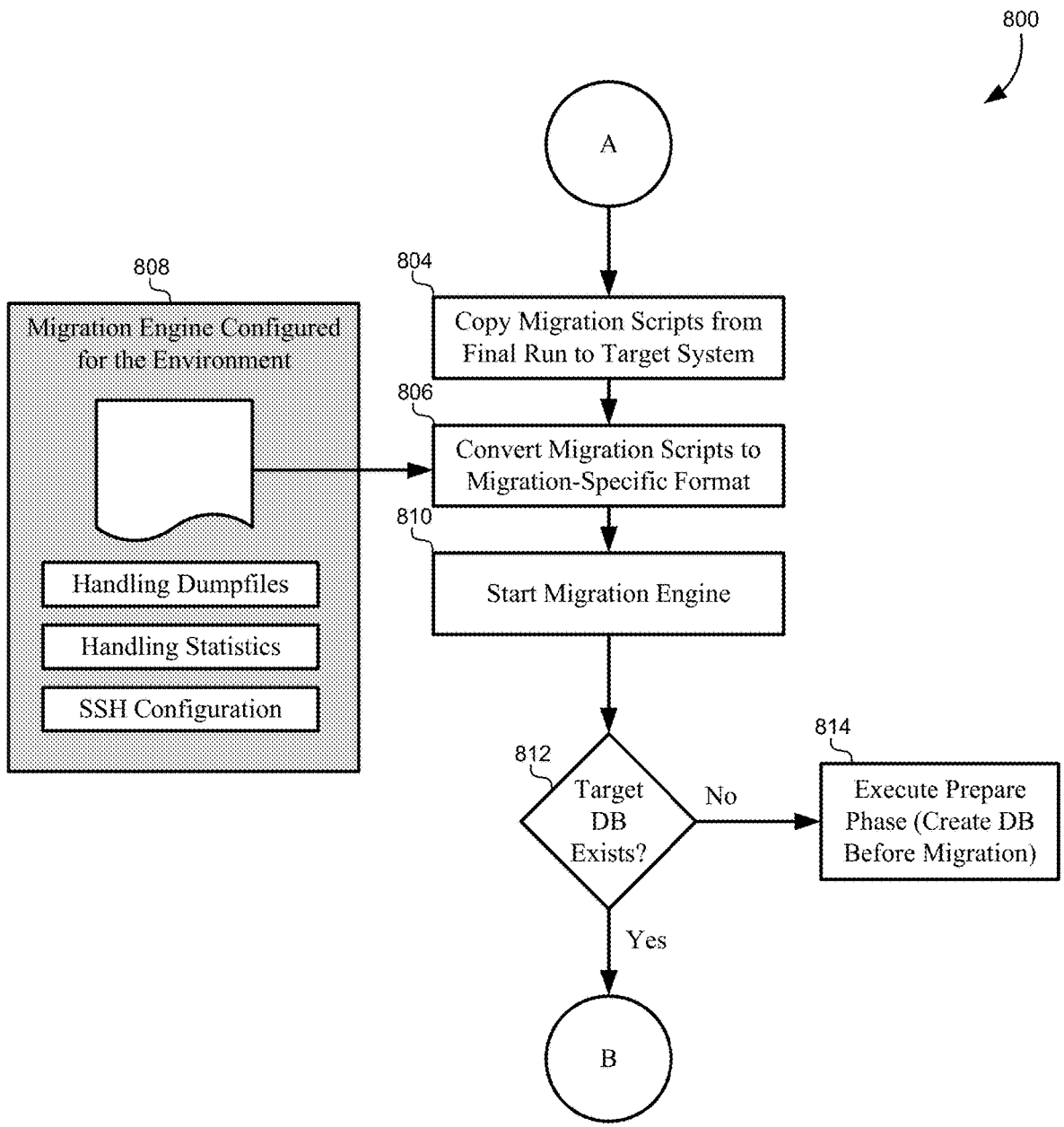
FIG. 8 illustrates a flowchart of a method for preparing to run a migration plan, according to one embodiment.

FIG. 8 illustrates a flowchart 800 of a method for preparing to run a migration plan, according to one embodiment. Flowchart 800 may continue at step A from flowchart 700. After generating a plurality of migration scripts, the scripts may be ordered and/or timed according to a migration plan. The migration plan may include all the options available for customizing how the scripts are executed by bundling all of the migration scripts into a single executable data flow. Generally, the migration plan may define the execution order of the migration scripts. Additionally, the migration plan may define migration scripts that can be parallelized. The migration plan may also specify timing constraints that dictate when certain migration scripts can be executed, when certain portions of the source database may be made unavailable, and how long migration scripts will be allowed to run. In one example, a migration plan may specify that database partitioning, migration, compression, and/or encryption may all be combined into a single offline session, and thus migration scripts for each of these functions may be executed during a single script batch according to the migration plan.

Additionally, databases may generally remain online while small chunks are migrated instead of taking the entire database offline for migration. The migration plan may be configured to minimize the offline time. However, certain migration scripts may require a database to be unavailable for certain intervals. Instead of making the data unavailable, records may be kept for changes made to source database material that has already been migrated to the target databases. These records may then be used to ensure that the target databases are later updated accordingly. In some embodiments, this mechanism may be installed across multiple source databases together via an installer for the purpose of consolidating many databases into a single target database. The full details of migrating database objects while the source database remains online are described in the co-assigned U.S. patent application Ser. No. 13/937,545, entitled "Online Database Migration" and filed concurrently with the present application on Jul. 9, 2013, the entire disclosure of which is hereby incorporated by reference for all purposes.

In order to properly order migration scripts, a scheduler system may be configured to manage migration script ordering. While many functions may be performed in parallel, some scripts may be dependent on others, thus requiring ordered and serial processing. For example, index generation for a database to be performed by the target database can only be performed after all of the target database information has been received. However the copying and index generation of a first database may be performed independently from the copying and index generation of a second database.

A scheduler system may be configured to identify an order of copying database objects with migration scripts. The execution order identified by the scheduler system may be based on factors such as the size of the database objects to be migrated and/or the dependencies of the database objects. The scheduler system may analyze available system resources of the source server system and/or the target server system to schedule functions (e.g., index generation and/or verifications functions). Further, the scheduler system may be able to take input from an administrator, who may provide various preferences before and during the migration. For example, the administrator may able to dynamically alter the number of migration functions permitted to perform in parallel by the source server system and the target server system during the migration via the scheduler system. Moreover, various types of functions may be scheduled by the scheduler system concurrently. For example, while a copy function between the source server system and the target server system is being performed, more available processing resources may be available at the target server system. The scheduler, if it determines that a sufficient amount of processing resources is available, may schedule execution of index generation by the target server system in parallel for a different database which has already been copied to the target server system. The full details of scheduling migration scripts during migration are described in the co-assigned U.S. patent application Ser. No. 13/937,486, entitled "Dynamic Migration Script Management" and filed concurrently with the present application on Jul. 9, 2013, the entire disclosure of which is hereby incorporated by reference for all purposes.

In preparation to run the migration plan, the migration scripts may be copied to the target database system 804. In some cases, migration scripts may need to be converted to a new format to run on a migration engine. In this case, migration scripts may be converted to a migration-specific format 806. Similarly, the migration engine itself may need to be configured for the particular migration environment for the target database systems 808.

Generally, the migration process may be carried out by a migration engine. The migration engine may be configured to control the execution of the migration plan such that the migration scripts are carried out in the correct sequence. Thus, the migration engine can execute the migration scripts in sequence and in parallel as appropriate. The migration engine may also be dynamically adjustable such that it can scale the amount of parallel processing up and down during the migration run. Therefore, the migration engine may analyze system resources and scale the amount of parallel processing in order to optimize the use of system resources. For example, if the customer database system is experiencing a large amount of traffic, the migration engine may dynamically scale the parallel processing of migration scripts down such that the performance of the customer database system is not adversely affected. Similarly, if the customer database system is experiencing relatively light traffic, such as at night, the migration engine may dynamically scale up the amount of parallel processing of migration scripts in order to utilize the available system resources. This information may be reported to the customer dynamically such that they can determine in real-time how resources should be used during the migration process.

After the pre-migration analysis is complete, and after the migration plan is generated and approved by the customer through the cloud portal, the migration engine may be started 810. First, the migration engine may determine whether the target database exists on the target server system 812. If not, the database may be created and formatted on the target system prior to migration 814.

Figure 9:
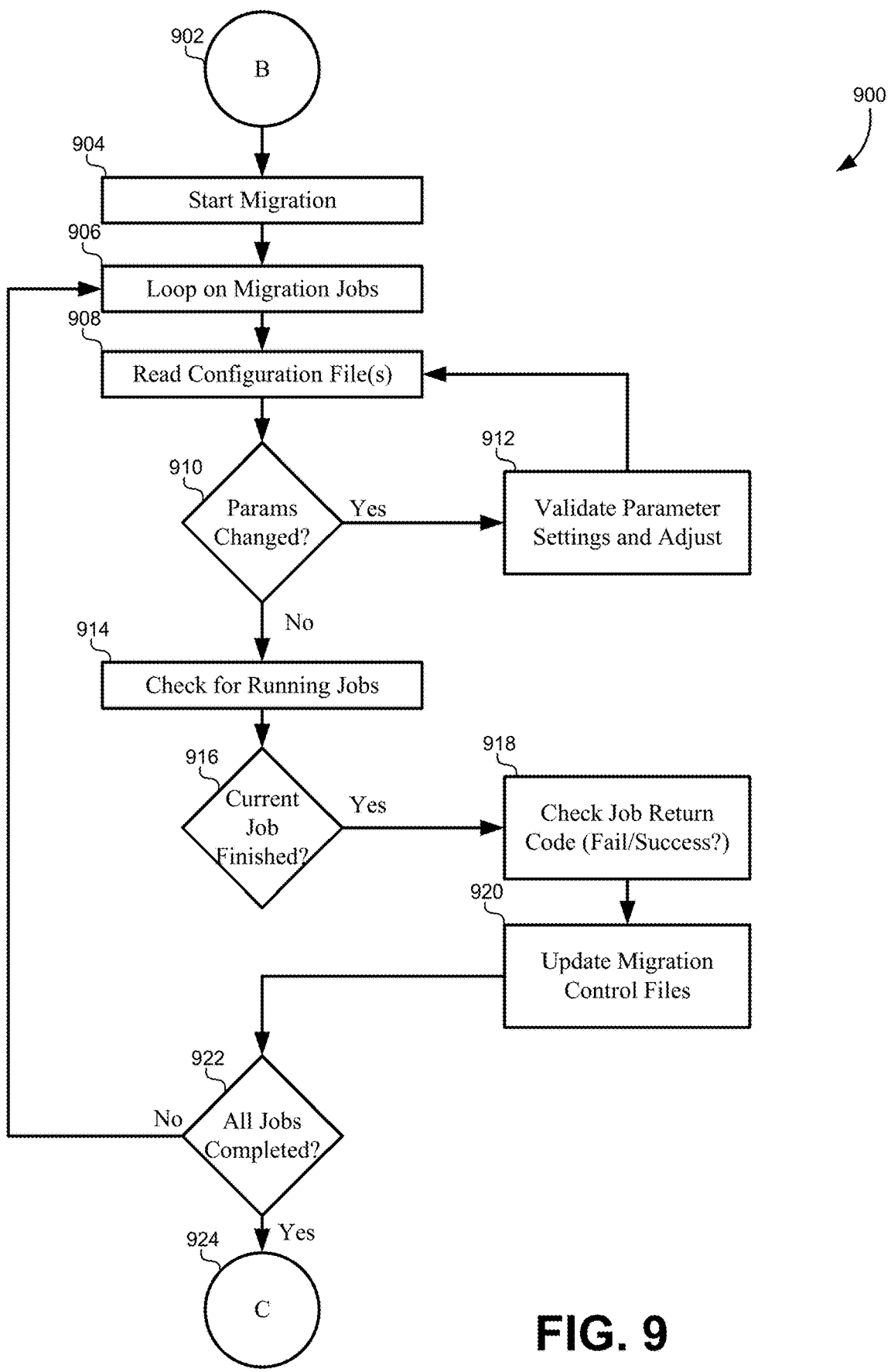
FIG. 9 illustrates a flowchart of a method for executing a migration plan that allows for dynamic customer tuning, according to one embodiment.

FIG. 9 illustrates a flowchart 900 of a method for executing a migration plan that allows for dynamic customer tuning, according to one embodiment. Flowchart 900 may continue from step B in flowchart 800. After the migration started 904, the migration engine may loop on the migration jobs as specified by the migration engine 906. One advantageous aspect of certain embodiments includes the ability of customer engineers to dynamically change the parameters of the migration process in real time as it is executed. For example, an engineer may dynamically adjust the amount of parallel processing by the migration engine in order to limit the amount of system resources used by the migration engine. The engineer may also change parameters that determine when certain data objects can be migrated and in what order. In some embodiments, any parameter used to generate the migration plan may be changed during execution by a customer. These parameters may also be changed automatically by the migration engine as described above. These automatic changes may be made according to business logic and other constraints provided to the migration engine by the customer or by the cloud support service.

Information associated with these parameters may be stored in a configuration file. This configuration file may be periodically checked as migration scripts are executed. If the parameters have changed 910, either by manual or automatic adjustment as described above, the migration engine may validate the new parameter settings and adjust the migration planning configuration file accordingly 912. When the parameters are current, the migration engine may execute the current job. As used herein, a "job" may include a migration script, or any other function performed by the migration engine, such as a logging or validation function. When the current job is finished 916, the migration engine can determine whether the job was successful. For example, the migration engine may check a job return code for indications of failure or success 918 and update the migration control files accordingly 920. During or after migration, the migration engine may consult the migration control files and attempt to re-execute any jobs that were not successful. When all the jobs are complete 922, the migration engine may stop looping on migration jobs and may move to the validation and post-migration analysis phase.

In some embodiments, each job may comprise a set of PL/SQL and Unix scripting that handles the data migration and is deployed on the source and/or targets. Other embodiments may utilize Perl and other technologies, such as installers, which facilitate the distribution of these scripts. The migration process may also interact closely with technologies that reduce the RTO. This may allow the engineer to configure two technologies at the same time, further reducing the Level of Effort (LoE) required to perform a migration exercise on a source/target database. One advantageous feature in some embodiments may be that the tooling and parameterized nature of the tooling reduces the need for high expertise and reduces errors. The reporting feature of the service allows the cloud support service to make multiple runs with minimum effort that would normally be required if this exercise was executed manually.

Figure 10:
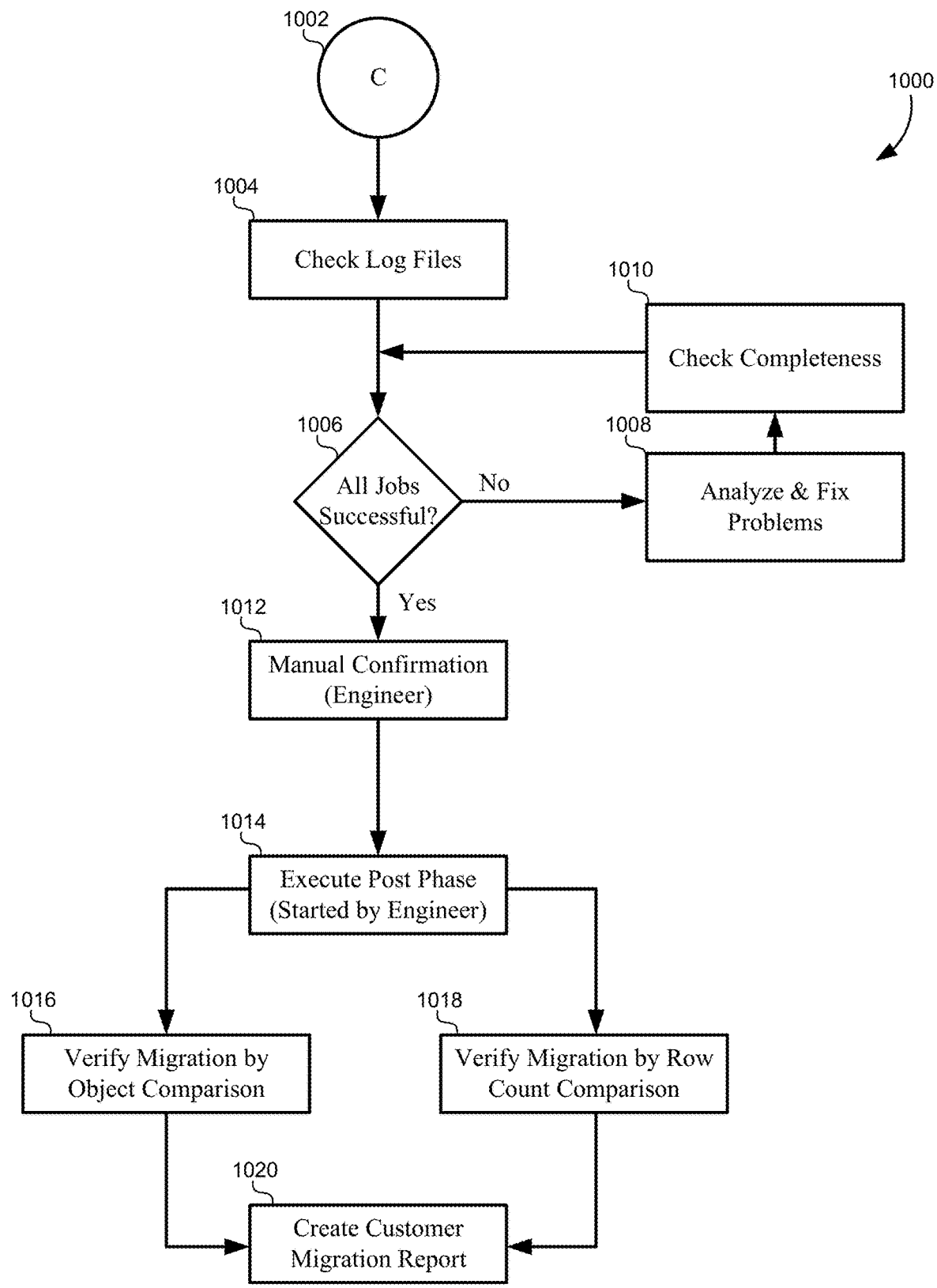
FIG. 10 illustrates a flowchart of a method for validating a database migration, according to one embodiment.

FIG. 10 illustrates a flowchart 1000 of a method for validating a database migration, according to one embodiment. Flowchart 1000 may continue from step C of flowchart 900. After all the migration scripts have been executed, the migration engine may execute a post-migration analysis. During this analysis, the migration engine may check the log files generated during the migration process 1004, and may determine whether all of the jobs were completed successfully 1006. If some jobs were not completed successfully, the migration engine may analyze and fix the problems that were recorded in the log files 1008, and ensure that the unsuccessful jobs have been completed 1010. For example, some data transfers may have been interrupted, and the remaining data may need to be migrated in order for the data set to be completed.

Once all the jobs are completed, the migration process may end. In some embodiments, manual confirmation by an engineer may be required in order to formally end the migration process and validate the data 1012. The customer engineer may then determine whether to verify the migration and what methods may be used. The portal may present different options to the engineer that may be used to validate the data. In other embodiments, post-migration validation may be executed automatically upon completion of the migration process.

In some embodiments, a row count procedure may be used to validate the migration process. Row counts in the target databases may be compared to row count in the source databases. Some embodiments may also select certain rows and compare the data therein to ensure that it was successfully migrated from the source to the target databases. The system may also report if the referential integrity of the database (e.g. primary keys, foreign keys, data modeling logic, views, synonym security, etc.) has been properly preserved during the migration.

In some embodiments, data may additionally or alternatively be verified by comparing objects 1016. For example, invalid objects that were detected in the source databases prior to migration may later be detected in the target databases and compared. If the number of invalid objects matches, then this will tend to indicate that the migration was successful. Also, this can be used to determine that invalid objects in the target database system are not the result of the migration process, but rather were carried over from the existing source databases. In some embodiments, other data validation techniques may also be used in combination with those described above. Checksums may be used, selective row validation may be used, manual inspection by an engineer may be used, and/or the like.

After the data is validated, a customer migration report may be generated 1020. The customer migration report may be presented to the customer through the portal and may summarize all of the statistics relevant to the migration. The customer migration report may describe any errors that were encountered, any corrective actions were taken in response thereto, any data errors detected during the validation process, a listing of invalid objects, a listing of row counts, timing parameters that describe how long each step in the migration process took to execute, indications of how long certain data objects were unavailable, comparative performance between the source database systems and the target database systems, comparative memory usage and latency between the source and target systems, and/or the like. The migration engine may also provide a log of all operations that took place during the migration, which may be accessed through the customer migration report of the portal.

Figure 11:
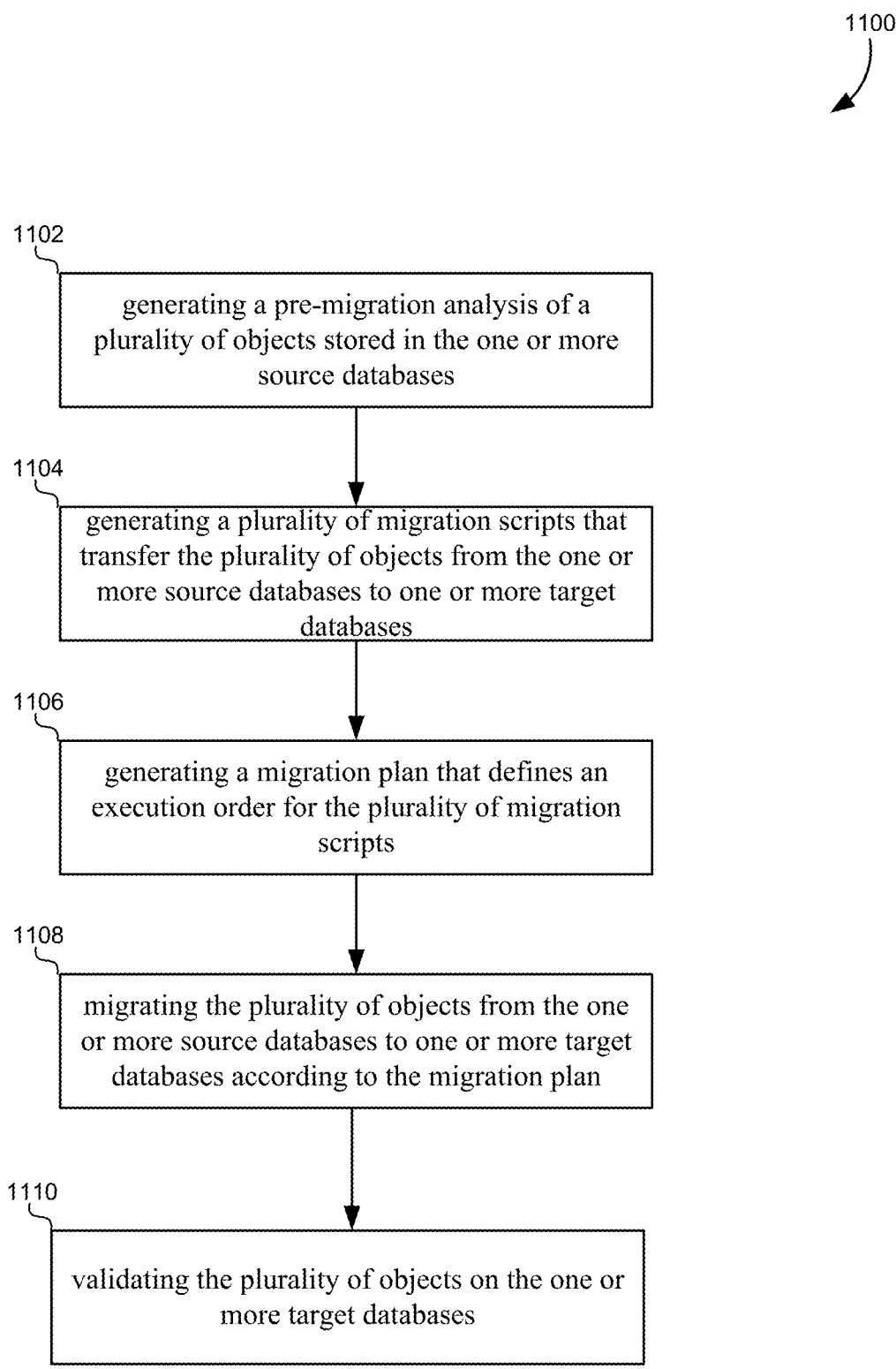
FIG. 11 illustrates a flowchart of a generalized method for migrating databases, according to one embodiment.

FIG. 11 illustrates a flowchart 1100 of a generalized method for migrating databases, according to one embodiment. Flowchart 1100 represents a generalized version of the database migration process using a cloud-based service as described above. The method may include generating a pre-migration analysis of a plurality of objects stored in one or more source databases 1102. The pre-migration analysis may be displayed or presented in a portal display of a cloud service that is remotely located from the one or more source databases and the one or more target databases. The pre-migration analysis may also include classifying objects in the databases, identifying installed database options, and/or identifying complex objects that require special handling during the migration. The pre-migration analysis may also include information received from a database modeling analysis provided by the cloud service.

The method may also include generating a plurality of migration scripts that transfer the plurality of objects from the one or more source databases to one or more target databases 1104. In some embodiments, each of the plurality of objects may be associated with a corresponding one of the plurality of migration scripts.

The method may additionally include generating a migration plan that defines an execution order for the plurality of migration scripts 1106. In some embodiments, the migration plan may further define which of the plurality of scripts can be executed in parallel during migration. The migration plan may also define an execution timing for the plurality of migration scripts. In some embodiments, the report may also be provided that illustrates a breakdown of which objects will be copied using each particular method. For example, a database table that is configured using Binary Large Object (BLOB) may need to be migrated using DataPump/Export and Import technologies. Similarly, an object configured to store VARCHAR2 may need to be copied using Create Table as Select (CTAS). The report may provide a breakdown on how much data will be migrated using each particular method. This allows the customer to view complex migration issues.

In some embodiments, the migration plan might also report on how long each step will take (or has taken) so that the customer can migrate only if the timeframe is acceptable. As part of the service, a cloud engineer can further refine this aspect of the migration using various tooling features to speed up, reconfigure, and otherwise ensure that the migration succeeds. It should be noted that this cloud-based support would not be available using a manual process. This granular level of reporting and the ability to compare previous migration runs and migration plans is a unique feature of the cloud-based support service described herein.

The method may further include migrating the plurality of objects from the one or more source databases to the one or more target databases according to the migration plan 1108. In some embodiments, the migration engine may receive one or more manual parameter adjustments during migration, and alter the migration plan during the migration according to the one or more manual parameter adjustments. These parameter adjustments may be generated automatically by the migration engine or may be received from a user interface.

The method may also include validating the plurality of objects on the one or more target databases 1110. In some embodiments, the plurality of objects may include a set of invalid objects from the one or more source databases. A determination may be made as to whether the set of invalid objects were correctly migrated to the one or more target databases. Additionally, validating the plurality of objects may also include determining whether a row count from the one or more source databases matches a row count from the one or more target databases. This feature may be particularly important in order to negate customer complaint escalations. Occasionally, customers may blame the invalid objects for the migration being unsuccessful. Instead, this helps the cloud-based service provide a benchmark to determine if logical objects in the source and the target were both invalid instead of being a product of faulty migration.

It will be understood that the generalized diagram of FIG. 11 can be readily modified to include any of the other details of database migration included elsewhere in this disclosure. For example, the pre-migration analysis may be performed using a gateway operating on the customer systems and in conjunction with a remote cloud service, a portal may be used to view post-migration reports, the migration engine may dynamically adjust the order/timing/parallelism of the migration scripts to optimize system resources, and so forth. Flowchart 1100 is merely meant to provide a framework into which any of these additional details may be added according to various embodiments. Therefore, flowchart 1100 is not meant to be limiting, and may include any and all features discussed in this disclosure in various combinations without restriction.

It should be appreciated that the specific steps illustrated in FIGS. 7-11 provide particular methods of performing a database migration as a service according to various embodiments of the present invention. Other sequences of steps may also be performed according to alternative embodiments. For example, alternative embodiments of the present invention may perform the steps outlined above in a different order. Moreover, the individual steps illustrated in FIGS. 7-11 may include multiple sub-steps that may be performed in various sequences as appropriate to the individual step. Furthermore, additional steps may be added or removed depending on the particular applications. One of ordinary skill in the art would recognize many variations, modifications, and alternatives.

As described above, this migration service may be provided by a remotely located cloud support system. Customers may interact with the cloud support system through a portal. What follows is a number of example user interfaces that may describe the interactions between the customer and the cloud support system during the automated migration process as described above. It will be understood that each of these interfaces is merely exemplary, and not meant to be limiting. Many other arrangements of visual controls and data presentations may also be used by various embodiments not shown explicitly herein.

Figure 12:
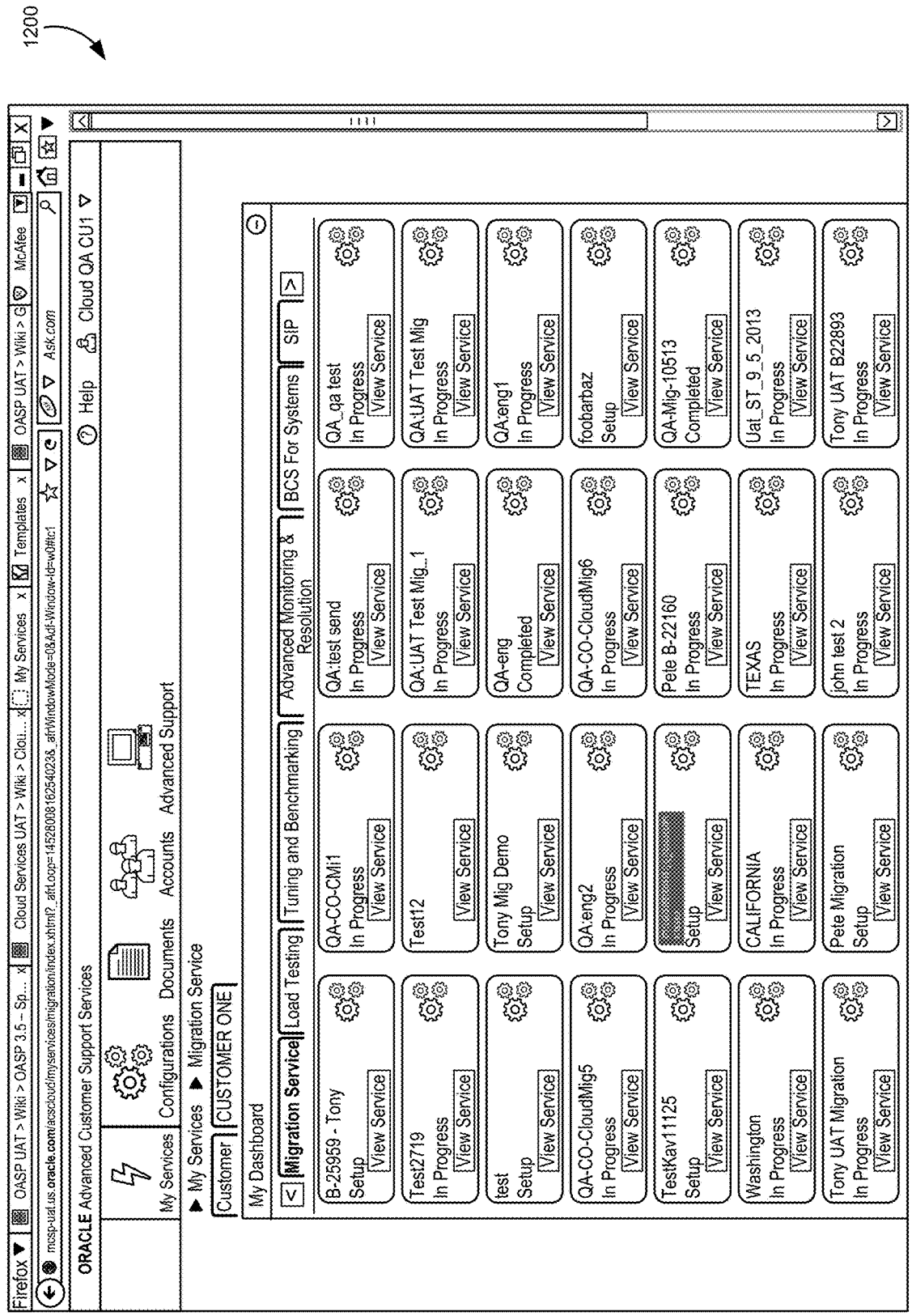
FIG. 12 illustrates a portal interface for selecting source and/or target databases for migration, according to one embodiment.

FIG. 12 illustrates a portal interface 1200 for selecting source and/or target databases for migration, according to one embodiment. The customer may enter a "My Services" section of the cloud support service portal and may select the migration service. Note that other services may also be available through the portal, such as load testing, tuning and benchmarking, advanced monitoring and resolution, and so forth. Some of these other services may be described in other commonly assigned applications filed on the same day and incorporated by reference at the beginning of this disclosure.

Portal interface 1200 may provide users with a listing of all registered source database systems that may be selected for migration. A user may select one or more icons that are descriptive of databases they would like to migrate. A similar interface may also be provided to select target database systems that are available to the customer locally or through the cloud support service.

Figure 13:
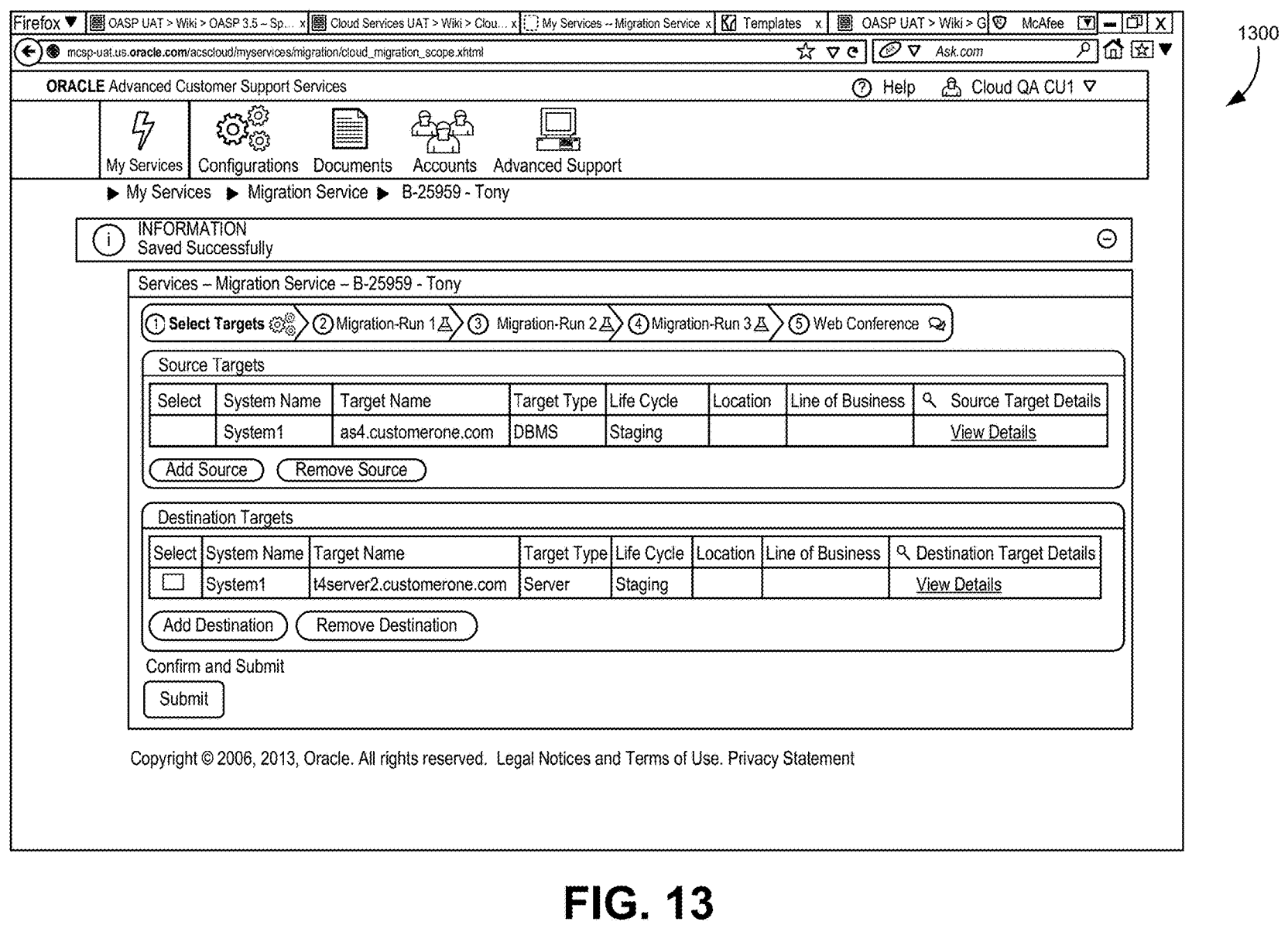

FIG. 13 illustrates a portal interface 1300 for viewing source and/or target databases, according to one embodiment. This interface shows the name, type, lifecycle, location, and associated business line for each of the source database systems and target database systems, thus providing an overview of the source database systems and target database system selected for the migration process. Note that interface 1300 also includes a status icon above the source targets that describes the current step in the migration process. For example, the user may progress through each of the three available migration runs.

Figure 14:
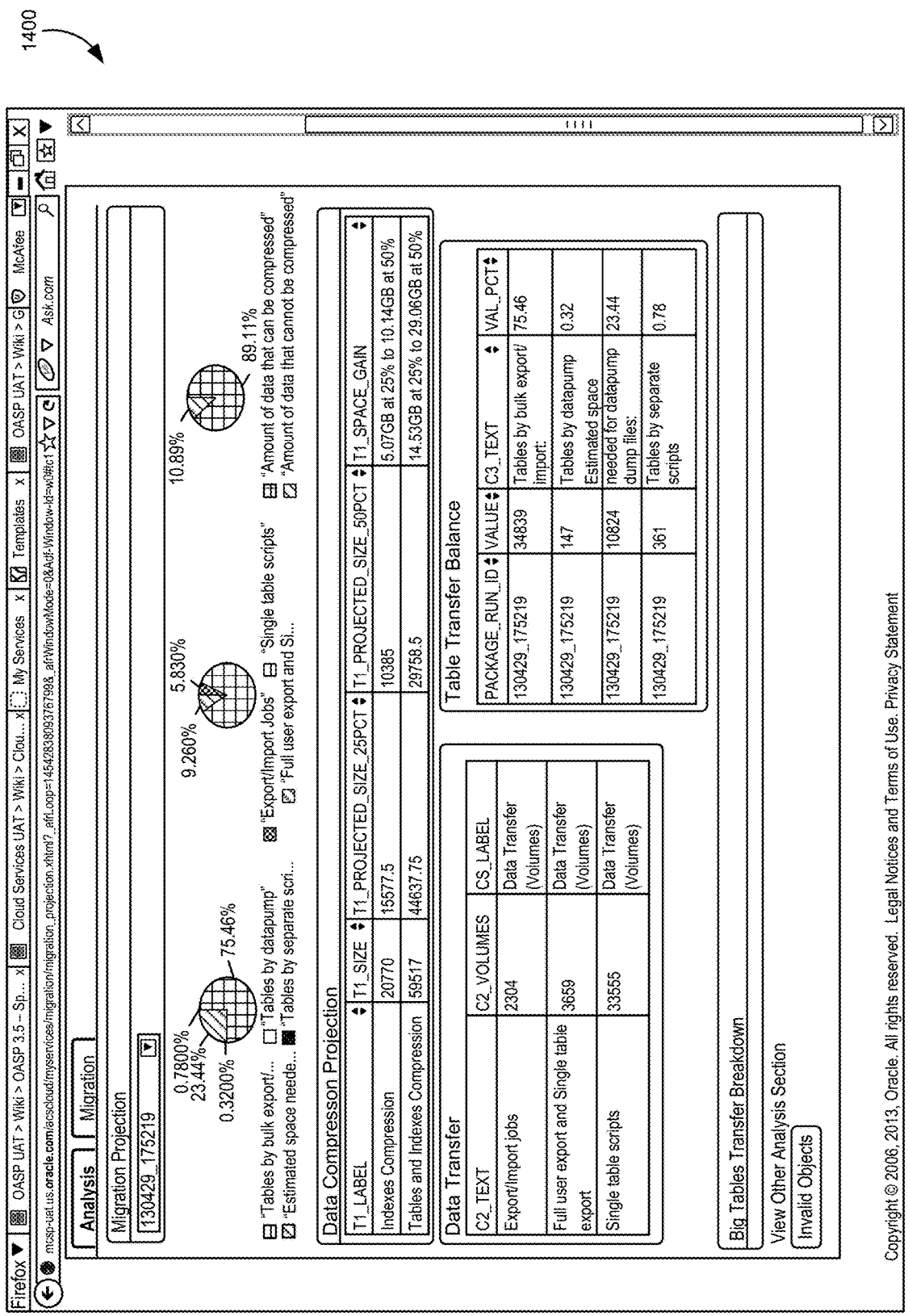
FIG. 14 illustrates a portal interface for a migration manager, according to one embodiment.

FIG. 14 illustrates a portal interface 1400 for a migration manager, according to one embodiment. The pre-migration analysis may be displayed in interface 1400 to provide the customer with an overview of the migration plan along with, for example, estimations on how much of the data can be compressed and how much space can be saved in the target database systems. This overview may also indicate which data can be migrated using particular processes, such as moving tables by data pump, by separate scripting functions, import/export jobs, SQL Create Table As Select statements (CTAS), and so forth. The portal 1400 may also indicate how much data can be compressed versus how much data cannot be compressed. A control may also be provided such that a user can get a list of invalid objects currently in the database. This list of invalid objects can act as a baseline as evidence that the migration process was not responsible for invalidating objects, and as a way for verifying the correctness of the migration process. This may speed up fault diagnosis after migration.

Figure 15:
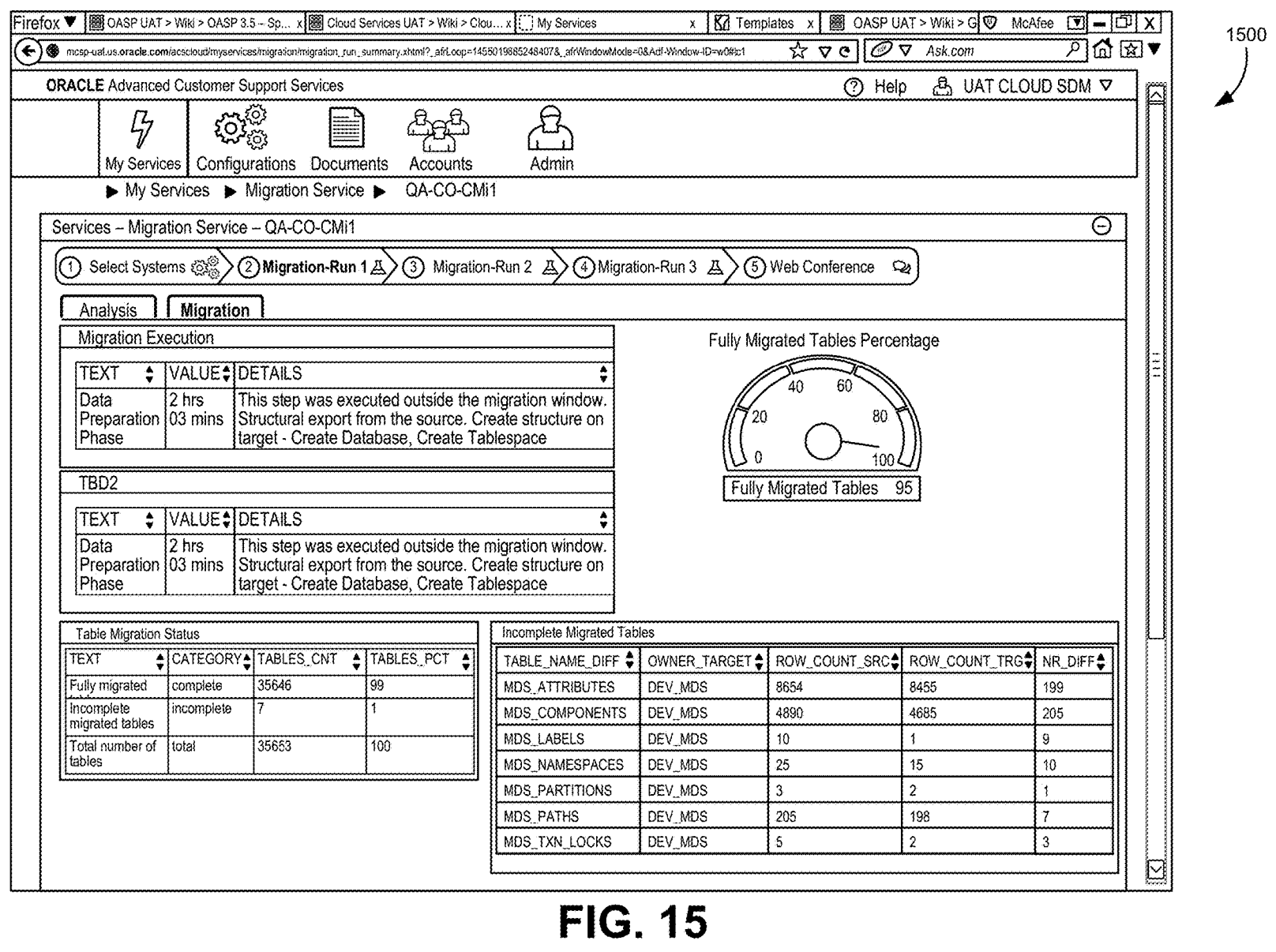

FIG. 15 illustrates a portal interface 1500 for viewing the results of a database migration, according to one embodiment. Interface 1500 may provide many different statistics regarding the quality of the migration process. For example, the interface 1500 may indicate whether certain migration scripts were executed outside of specified time intervals, or took longer than expected. An indication of the percentage of fully migrated tables may also be provided. Most importantly, information may be provided describing migration tables that were not completed and errors that occurred during the migration process.

Figure 16:
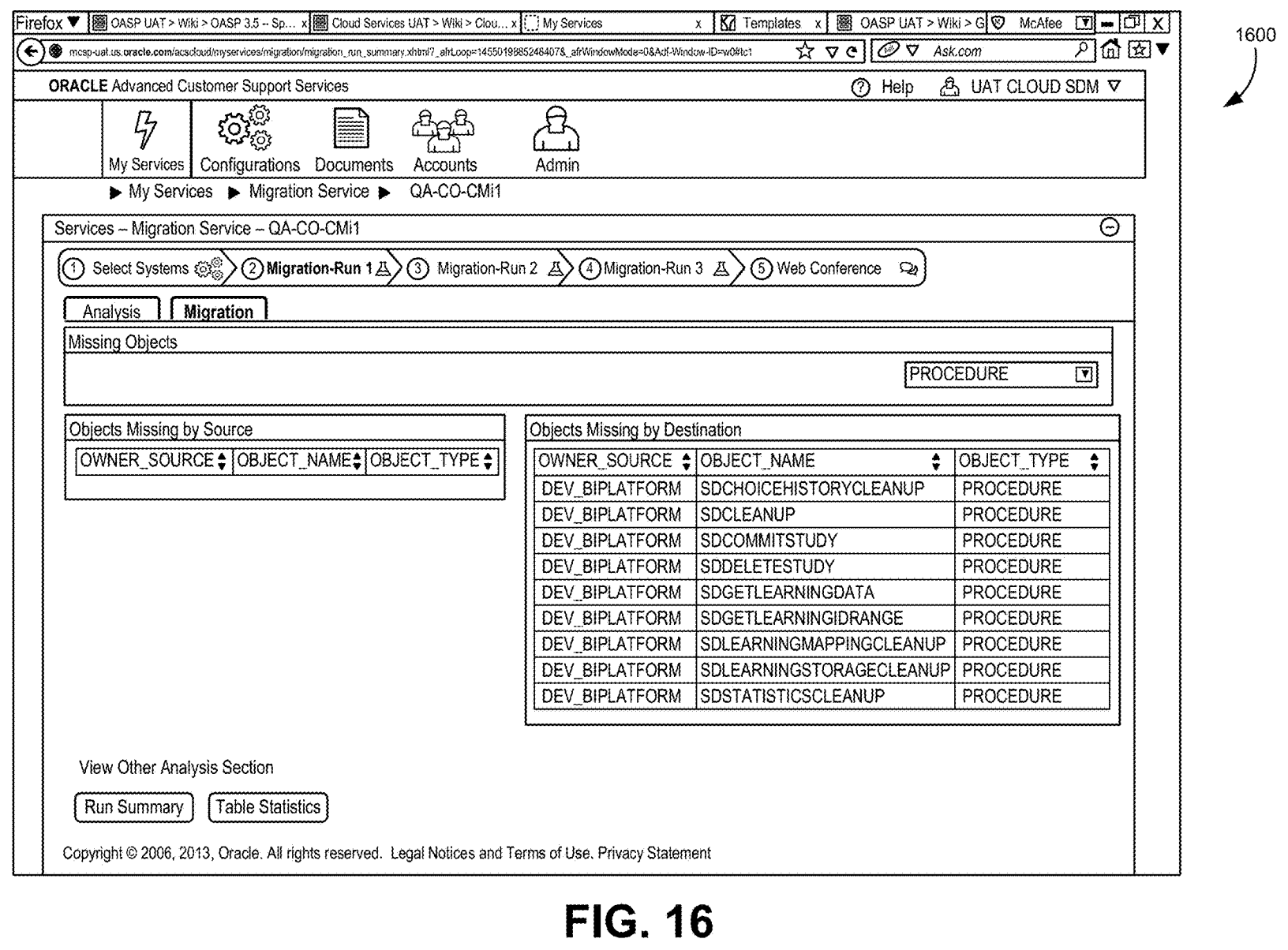

FIG. 16 illustrates a portal interface 1600 for determining if objects are missing after the migration, according to one embodiment. Interface 1600 may provide a list of missing objects that did not get copied from the source databases to the target databases. A user may click a link on interface 1500 to view interface 1600. Missing objects may be displayed according to their source and their name for easy identification.

Figure 17:
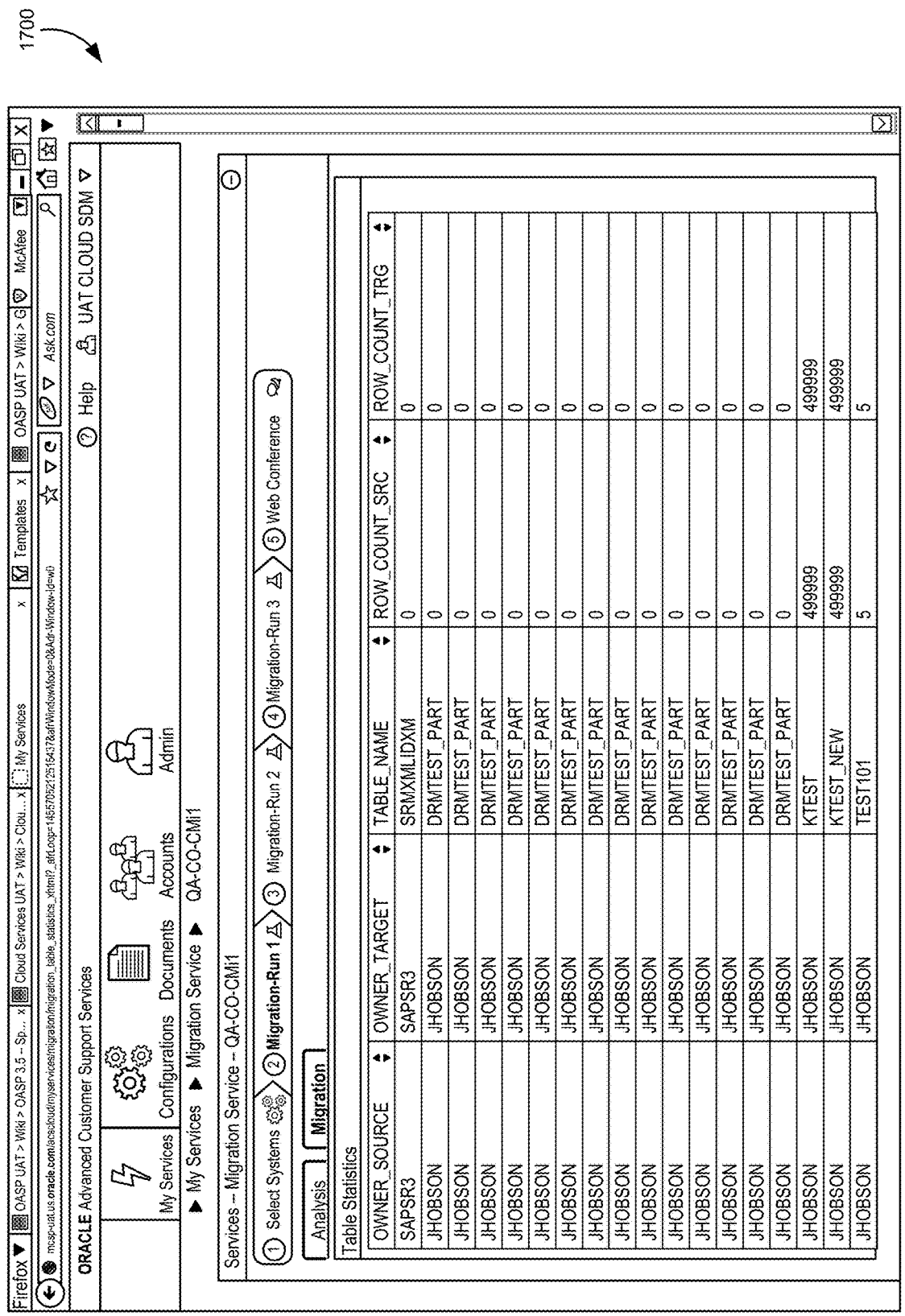
FIG. 17 illustrates a portal interface for validating row counts after migration, according to one embodiment.

FIG. 17 illustrates a portal interface 1700 for validating row counts after migration, according to one embodiment. As described above, row counts can also be used as a method for validating the migration process. Interface 1700 may provide a full rundown of all the tables and their row counts for auditing purposes. In some embodiments, discrepancies may be visually or graphically highlighted for the customer.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method of migrating data from one or more source databases to one or more target databases, the method comprising:
   receiving, at a cloud-based system, data associated with the one or more source databases and the one or more target databases;
   generating, at the cloud-based system, a plurality of migration scripts that transfer a plurality of objects from the one or more source databases to the one or more target databases, based on the data associated with the one or more source databases and the one or more target databases;
   displaying, through a user interface, a migration plan comprising:
      an order in which the plurality of migration scripts will be executed during migration to minimize downtime during migration of the one or more source databases; and
      indications of which of the plurality of migration scripts can be executed in parallel;
   while migrating the plurality of objects, executing a number of migration scripts in parallel, according to the migration plan;
   while migrating the plurality of objects, receiving an input through the user interface adjusting an amount of parallel processing during the migration; and
   while migrating the plurality of objects, scaling up or down the number of migration scripts executed in parallel based on the input received through the user interface.

2. The method of claim 1, wherein the migration plan displayed through the user interface further comprises a graph illustrating:
   an amount of data in the one or more source databases that can be compressed on the one or more target databases; and
   an amount of data in the one or more source databases that cannot be compressed on the one or more target databases.

3. The method of claim 2, wherein the migration plan displayed through the user interface further comprises a table illustrating how much of the amount of data in the one or more source databases that can be compressed on the one or more target databases includes compressed indexes.

4. The method of claim 1, wherein the migration plan displayed through the user interface further comprises a graph illustrating a total number of import/export jobs in the migration plan.

5. The method of claim 1, wherein the migration plan displayed through the user interface further comprises a graph illustrating:
   a number of tables in the one or more source databases that will be transferred by boat export/import;
   a number of tables in the one or more source databases that will be transferred by datapump; and
   a number of tables in the one or more source databases that will be transferred by separate scripts.

6. The method of claim 1, further comprising generating a pre-migration analysis for the plurality of objects stored in the one or more source databases based on the data associated with the one or more source databases and the one or more target databases.

7. The method of claim 6, wherein the pre-migration analysis comprises:
   classifying the of plurality objects, identifying installed database options, and identifying complex objects that require special handling while migrating the plurality of objects; and
   reconfiguring the complex objects such that a number of instances where the complex objects are unavailable is reduced.

8. The method of claim 1, wherein the cloud-based system is located remotely from the source databases and from the target databases and is configured to collect and analyze data from the source databases and from the target databases through a gateway.

9. The method of claim 1, wherein the migration plan further comprises timing constraints that dictate when each of the plurality of migration scripts can be executed.

10. The method of claim 1, further comprising, after migrating the plurality of objects, validating the plurality of objects on the one or more target databases.

11. The method of claim 1, wherein:
    the one or more target databases comprise a single target database;
    the one or more source databases comprise a plurality of source databases; and
    the plurality of source databases are migrated to the single target database.

12. The method of claim 1, further comprising presenting a real-time migration report through the user interface, wherein the real-time migration report indicates progress while migrating the plurality of objects from the one or more source databases to one or more target databases according to the migration plan.

13. The method of claim 1 further comprising:
    receiving one or more manual parameter adjustments during migration; and
    altering the migration plan during the migration according to the one or more manual parameter adjustments.

14. The method of claim 1 further comprising determining, based on the data associated with the one or more source databases and the one or more target databases, which of the plurality of migration scripts can be executed in parallel during migration.

15. A non-transitory computer-readable memory comprising a sequence of instructions which, when executed by one or more processors, causes the one or more processors to perform operations comprising:
    receiving, at a cloud-based system, data associated with one or more source databases and one or more target databases;
    generating, at the cloud-based system, a plurality of migration scripts that transfer a plurality of objects from the one or more source databases to the one or more target databases, based on the data associated with the one or more source databases and the one or more target databases;
    displaying, through a user interface, a migration plan comprising:
       an order in which the plurality of migration scripts will be executed during migration to minimize downtime during migration of the one or more source databases; and
       indications of which of the plurality of migration scripts can be executed in parallel;

while migrating the plurality of objects, executing a number of migration scripts in parallel, according to the migration plan;

while migrating the plurality of objects, receiving an input through the user interface adjusting an amount of parallel processing during the migration; and while migrating the plurality of objects, scaling up or down the number of migration scripts executed in parallel based on the input received through the user interface.

16. The non-transitory computer-readable memory of claim 15, comprising additional instructions that cause the one or more processors to perform additional operations comprising presenting a post-migration report through the user interface, wherein the post-migration report comprises data resulting from validating of the plurality of objects on the one or more target databases.

17. The non-transitory computer-readable memory of claim 15, comprising additional instructions that cause the one or more processors to perform additional operations comprising presenting a real-time migration report through the user interface, wherein the real-time migration report indicates progress while migrating the plurality of objects from the one or more source databases to one or more target databases according to the migration plan.

18. A system comprising:
one or more processors; and
a memory communicatively coupled with and readable by the one or more processors and comprising a sequence of instructions which, when executed by the one or more processors, cause the one or more processors to perform operations comprising:
   receiving, at a cloud-based system, data associated with one or more source databases and one or more target databases;
   generating, at the cloud-based system, a plurality of migration scripts that transfer a plurality of objects from the one or more source databases to the one or more target databases, based on the data associated with the one or more source databases and the one or more target databases;
   displaying, through a user interface, a migration plan comprising:
      an order in which the plurality of migration scripts will be executed during migration to minimize downtime during migration of the one or more source databases; and
      indications of which of the plurality of migration scripts can be executed in parallel;
   while migrating the plurality of objects, executing a number of migration scripts in parallel, according to the migration plan;
   while migrating the plurality of objects, receiving an input through the user interface adjusting an amount of parallel processing during the migration; and
   while migrating the plurality of objects, scaling up or down the number of migration scripts executed in parallel based on the input received through the user interface.

19. The system of claim 18, wherein the memory comprises additional instructions that cause the one or more processors to perform additional operations comprising:
   determining that one or more index files for the source databases should not be copied to the target databases; and
   based on the determination, instructing one or more of the target databases to generate new index files corresponding to the one or more index files not copied from the source databases.

20. The system of claim 18, wherein migrating the plurality of objects is performed in response to a customer request for data migration, and
   wherein the migration plan is generated preemptively, prior to the customer request for data migration, based on the data associated with the one or more source databases and the one or more target databases.

* * * * *

UNITED STATES PATENT AND TRADEMARK OFFICE
CERTIFICATE OF CORRECTION

PATENT NO. : 10,691,654 B2  
APPLICATION NO. : 16/003557  
DATED : June 23, 2020  
INVENTOR(S) : Higginson et al.

Page 1 of 1

It is certified that error appears in the above-identified patent and that said Letters Patent is hereby corrected as shown below:

In the Drawings

On sheet 6 of 17, in FIG. 6, under Reference Numeral 632, Line 1, delete "Assesment" and insert -- Assessment --, therefor.

In the Specification

In Column 10, Line 31, delete "may may be" and insert -- may be --, therefor.

In Column 10, Line 58, delete "may be be" and insert -- may be --, therefor.

Signed and Sealed this  
Fourth Day of May, 2021

Drew Hirshfeld  
*Performing the Functions and Duties of the*  
*Under Secretary of Commerce for Intellectual Property and*  
*Director of the United States Patent and Trademark Office*